(12) United States Patent
Ye et al.

(10) Patent No.: US 12,732,986 B2
(45) Date of Patent: Sep. 8, 2026

(54) NODE SCHEDULING METHOD AND APPARATUS

(71) Applicant: Huawei Technologies Co., Ltd., Shenzhen (CN)

(72) Inventors: Deshi Ye, Hangzhou (CN); Songyang Chen, Hangzhou (CN); Jian Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 18/346,709

(22) Filed: Jul. 3, 2023

(65) Prior Publication Data

US 2023/0354296 A1 Nov. 2, 2023

Related U.S. Application Data

(63) Continuation of application No. PCT/CN2022/070268, filed on Jan. 5, 2022.

(30) Foreign Application Priority Data

Jan. 12, 2021 (CN) ......................... 202110038959.4

(51) Int. Cl.
*H04W 72/12* (2023.01)
*H04L 47/34* (2022.01)

(52) U.S. Cl.
CPC ............. *H04W 72/12* (2013.01); *H04L 47/34* (2013.01)

(58) Field of Classification Search
None
See application file for complete search history.

(56) References Cited

U.S. PATENT DOCUMENTS

2014/0233515 A1* 8/2014 Chen ..................... H04L 5/0037 370/329
2017/0104568 A1* 4/2017 Nasiri Khormuji .. H04L 5/0048
(Continued)

FOREIGN PATENT DOCUMENTS

CN 101651629 * 2/2010 ........... H04L 12/861
CN 110955463 * 4/2020 ............ H04L 29/08
(Continued)

OTHER PUBLICATIONS

Ren, Jinke, Yinghui He, Dingzhu Wen, Guanding Yu, Kaibin Huang, and Dongning Guo. "Scheduling for cellular federated edge learning with importance and channel awareness." IEEE Transactions on Wireless Communications 19, No. 11 (2020): 7690-7703. (Year: 2020).*

(Continued)

*Primary Examiner* — Nishant Divecha
*Assistant Examiner* — Caleb James Ballowe
(74) *Attorney, Agent, or Firm* — Slater Matsil, LLP

(57) ABSTRACT

A first node obtains local processing time separately corresponding to a plurality of second nodes and/or uploading time of local processing results separately corresponding to the plurality of second nodes. The first node soils sequence numbers of the plurality of second nodes based on the local processing time and/or the uploading time, to obtain a first sequence. The first node determines a second sequence based on the first sequence, where the second sequence includes some or all second node sequence numbers in the first sequence. The first node schedules second nodes corresponding to the sequence numbers included in the second sequence.

20 Claims, 13 Drawing Sheets

(56) References Cited

U.S. PATENT DOCUMENTS

2022/0346132 A1* 10/2022 Shen ...................... G06N 20/00
2022/0386347 A1* 12/2022 Wang .................. H04W 72/121
2023/0038071 A1* 2/2023 Shen ..................... H04W 72/02
2023/0068386 A1* 3/2023 Akdeniz ................ G06N 3/084

FOREIGN PATENT DOCUMENTS

| | | | | |
|---|---|---|---|---|
| CN | 112084034 A | | 12/2020 | |
| CN | 112181666 A | | 1/2021 | |
| WO | WO-2016179313 A1 | * | 11/2016 | ............ H04W 72/54 |
| WO | WO-2020135525 A1 | * | 7/2020 | .......... H04W 72/566 |
| WO | WO-2021219054 A1 | * | 11/2021 | ........... G06F 9/5094 |

OTHER PUBLICATIONS

McMahan, et al., Communication-Efficient Learning of Deep Networks from Decentralized Data, AISTATS, Feb. 28, 2017, total 11 pages.

T. Nishio and R. Yonetani, Client selection for federated learning with heterogeneous resources in mobile edge, ICC, May 20-24, 2019, total 7 pages.

Shi, W., Zhou, S., and Niu, Z. Device scheduling with fast convergence for wireless federated learning. In ICC 2020-2020 IEEE International Conference on Communications (ICC), Jun. 7-11, 2020, total 6 pages.

Zeng, Rongfei et al: "FMore: An Incentive Scheme of Multidimensional Auction for Federated Learning in MEC", Feb. 22, 2020, XP081937131, total 12 pages.

Zeng, Qunsong et al: "Energy-Efficient Radio Resource Allocation for Federated Edge Learning", Jun. 7, 2020, XP033796096, total 6 pages.

* cited by examiner

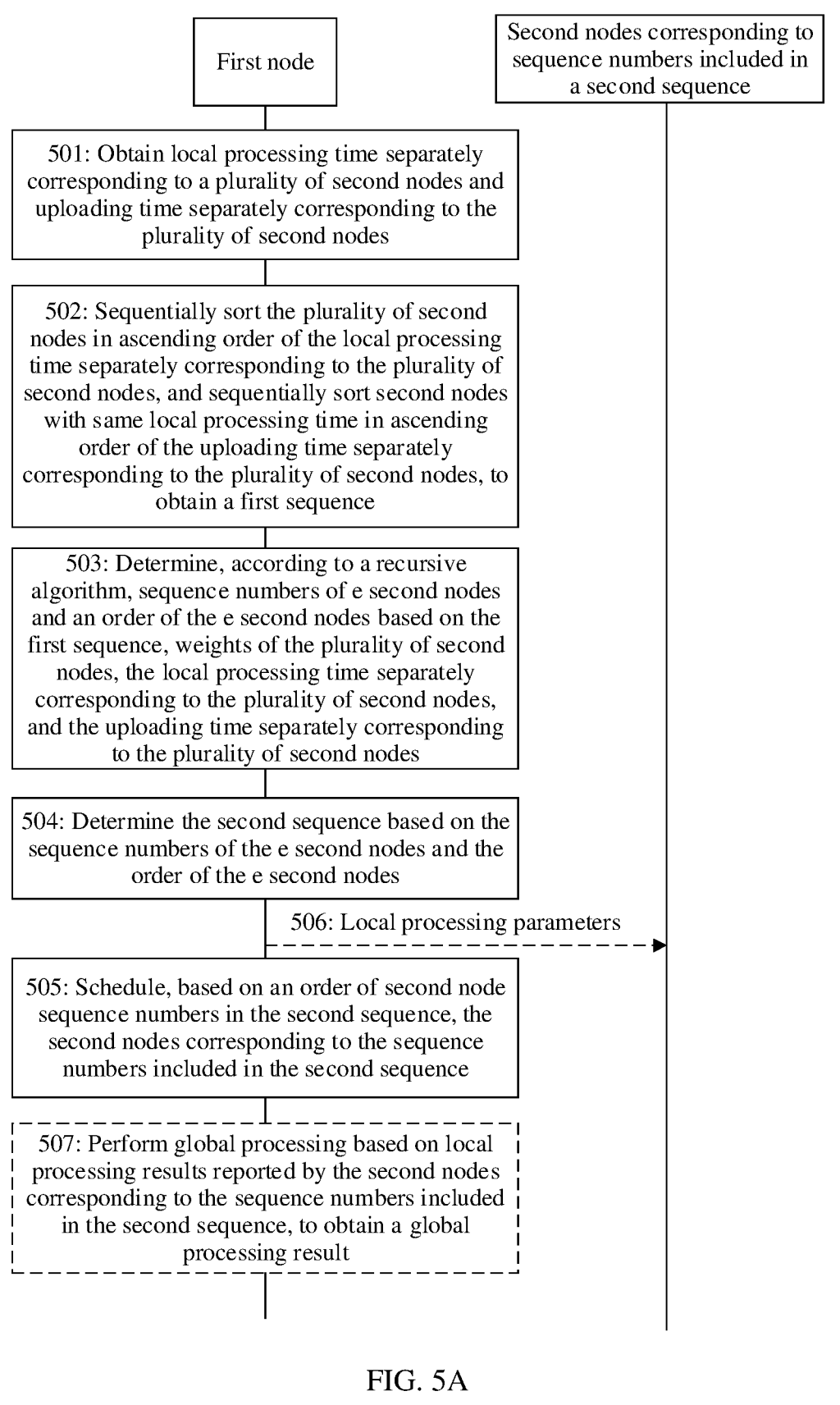

First node

Second nodes corresponding to sequence numbers included in a second sequence

501: Obtain local processing time separately corresponding to a plurality of second nodes and uploading time separately corresponding to the plurality of second nodes 502: Sequentially sort the plurality of second nodes in ascending order of the local processing time separately corresponding to the plurality of second nodes, and sequentially sort second nodes with same local processing time in ascending order of the uploading time separately corresponding to the plurality of second nodes, to obtain a first sequence 503: Determine, according to a recursive algorithm, sequence numbers of e second nodes and an order of the e second nodes based on the first sequence, weights of the plurality of second nodes, the local processing time separately corresponding to the plurality of second nodes, and the uploading time separately corresponding to the plurality of second nodes 504: Determine the second sequence based on the sequence numbers of the e second nodes and the order of the e second nodes 506: Local processing parameters 505: Schedule, based on an order of second node sequence numbers in the second sequence, the second nodes corresponding to the sequence numbers included in the second sequence 507: Perform global processing based on local processing results reported by the second nodes corresponding to the sequence numbers included in the second sequence, to obtain a global processing result

FIG. 5A

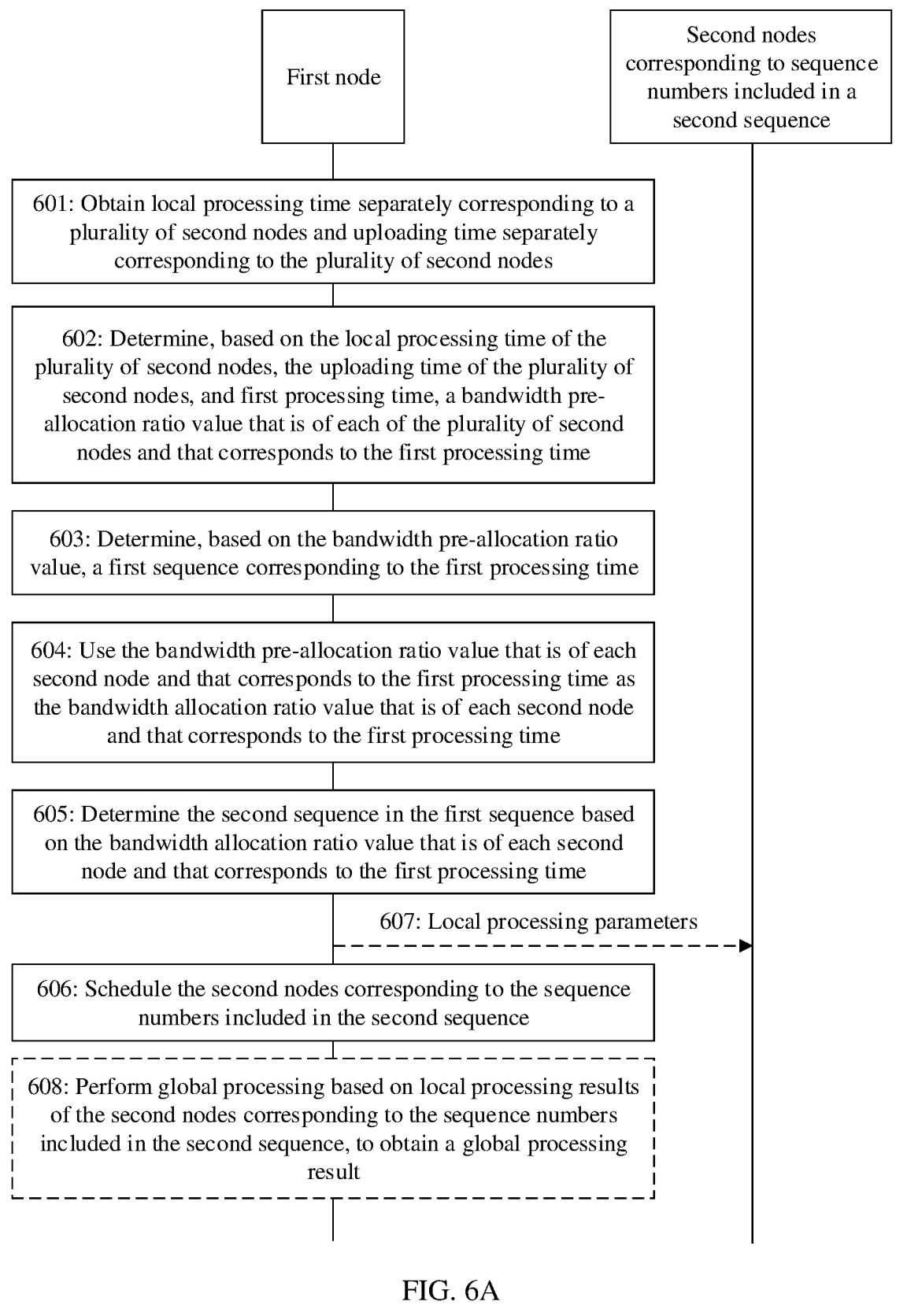

First node

Second nodes corresponding to sequence numbers included in a second sequence

601: Obtain local processing time separately corresponding to a plurality of second nodes and uploading time separately corresponding to the plurality of second nodes 602: Determine, based on the local processing time of the plurality of second nodes, the uploading time of the plurality of second nodes, and first processing time, a bandwidth pre-allocation ratio value that is of each of the plurality of second nodes and that corresponds to the first processing time 603: Determine, based on the bandwidth pre-allocation ratio value, a first sequence corresponding to the first processing time 604: Use the bandwidth pre-allocation ratio value that is of each second node and that corresponds to the first processing time as the bandwidth allocation ratio value that is of each second node and that corresponds to the first processing time 605: Determine the second sequence in the first sequence based on the bandwidth allocation ratio value that is of each second node and that corresponds to the first processing time 607: Local processing parameters 606: Schedule the second nodes corresponding to the sequence numbers included in the second sequence 608: Perform global processing based on local processing results of the second nodes corresponding to the sequence numbers included in the second sequence, to obtain a global processing result

FIG. 6A

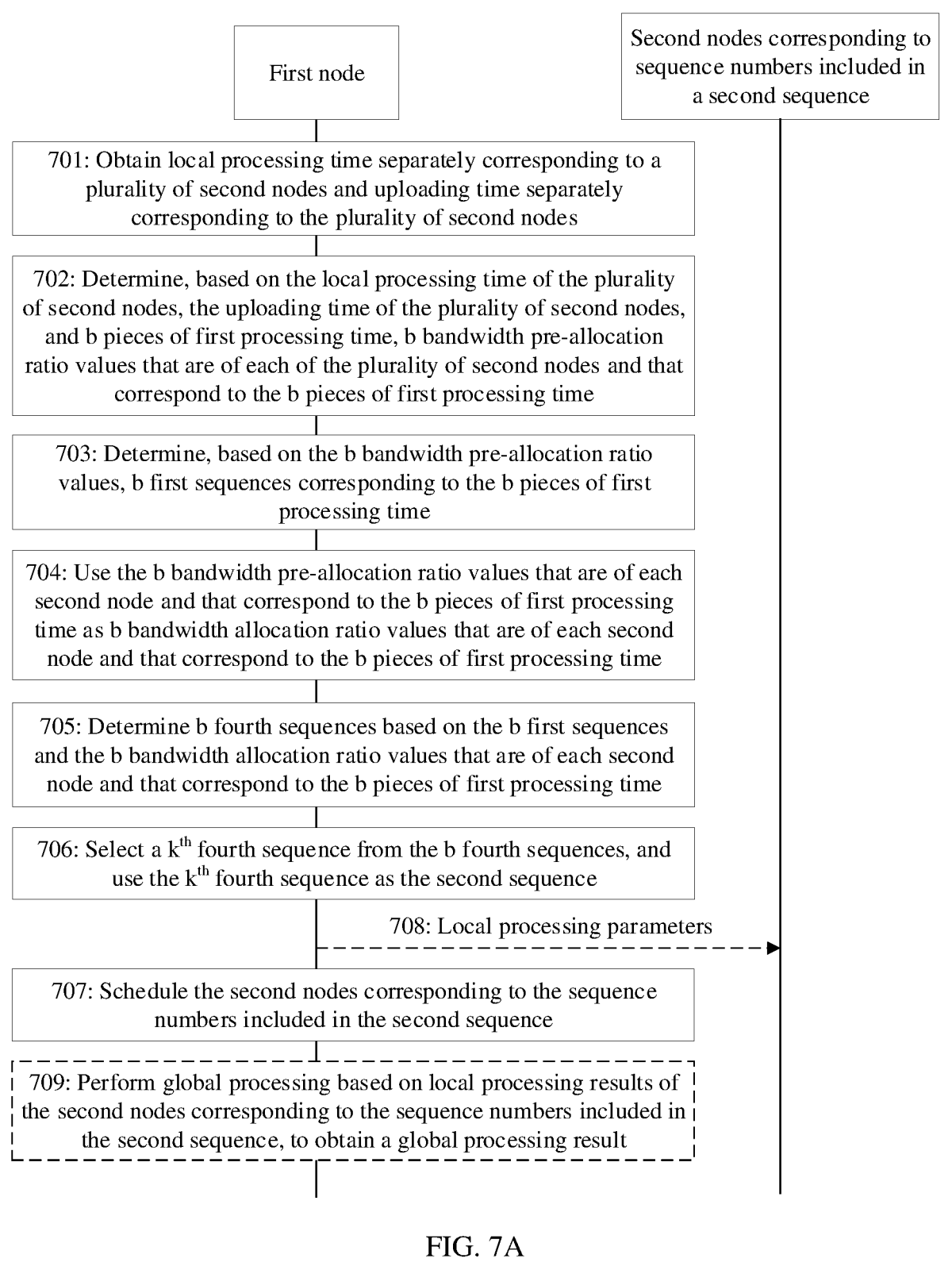

First node

Second nodes corresponding to sequence numbers included in a second sequence

701: Obtain local processing time separately corresponding to a plurality of second nodes and uploading time separately corresponding to the plurality of second nodes 702: Determine, based on the local processing time of the plurality of second nodes, the uploading time of the plurality of second nodes, and b pieces of first processing time, b bandwidth pre-allocation ratio values that are of each of the plurality of second nodes and that correspond to the b pieces of first processing time 703: Determine, based on the b bandwidth pre-allocation ratio values, b first sequences corresponding to the b pieces of first processing time 704: Use the b bandwidth pre-allocation ratio values that are of each second node and that correspond to the b pieces of first processing time as b bandwidth allocation ratio values that are of each second node and that correspond to the b pieces of first processing time 705: Determine b fourth sequences based on the b first sequences and the b bandwidth allocation ratio values that are of each second node and that correspond to the b pieces of first processing time 706: Select a $k^{th}$ fourth sequence from the b fourth sequences, and use the $k^{th}$ fourth sequence as the second sequence 708: Local processing parameters 707: Schedule the second nodes corresponding to the sequence numbers included in the second sequence 709: Perform global processing based on local processing results of the second nodes corresponding to the sequence numbers included in the second sequence, to obtain a global processing result

FIG. 7A

NODE SCHEDULING METHOD AND APPARATUS

CROSS-REFERENCE TO RELATED APPLICATIONS

This application is a continuation of International Application No. PCT/CN2022/070268, filed on Jan. 5, 2022, which claims priority to Chinese Patent Application No. 202110038959.4, filed on Jan. 12, 2021. The disclosures of the aforementioned applications are hereby incorporated by reference in their entireties.

TECHNICAL FIELD

This application relates to the machine learning field, and in particular, to a node scheduling method and an apparatus.

BACKGROUND

With advent of the big data era, each device generates a large amount of raw data in various forms every day. Conventional centralized learning requires each edge device to centrally transmit local data to a central server. The central server performs model training and learning based on the collected local data of each edge device. However, the central server needs to collect local data from all edge devices, resulting in a huge communication loss and a high computing capability requirement.

To resolve problems of the communication loss and the computing capability requirement, currently, federated learning or distributed learning is used to implement a global processing process such as model training or data inference through collaboration. Specifically, some nodes are randomly selected from a plurality of nodes, and the nodes are scheduled to feed back local processing results. Global processing is performed based on the local processing results separately sent by the nodes, to obtain a global processing result.

When communication resources and computing resources are limited, a manner of selecting and scheduling the nodes needs to be further optimized.

SUMMARY

Embodiments of this application provide a node scheduling method and an apparatus, to implement scheduling of a first node on a second node.

According to a first aspect in embodiments of this application, a node scheduling method is provided. The method is applied to a first node, and communication connections are established between the first node and a plurality of second nodes. The first node obtains local processing time separately corresponding to the plurality of second nodes and/or uploading time separately corresponding to the plurality of second nodes. Then, the first node sorts sequence numbers of the plurality of second nodes based on the local processing time separately corresponding to the plurality of second nodes and the uploading time separately corresponding to the plurality of second nodes, to obtain a first sequence. The first node determines a second sequence based on the first sequence. The second sequence includes some or all second node sequence numbers in the first sequence. The first node schedules second nodes corresponding to the sequence numbers included in the second sequence.

In this embodiment, the first node selects and schedules some second nodes based on the local processing time of the plurality of second nodes and the uploading time of the plurality of second nodes, to optimize a scheduling manner of selecting and scheduling the second nodes by the first node. Further, the first node may perform global processing with reference to local processing results fed back by the second nodes. In this way, efficiency of performing global processing by the first node can be improved, or accuracy of a global processing result obtained by the first node can be improved.

In a possible implementation, the node scheduling method is applied to a machine learning system, and the machine learning system includes the first node and the plurality of second nodes.

In this possible implementation, the node scheduling method provided in this embodiment of this application may be applied to the machine learning system, so that the first node selects and schedules the second node in the machine learning system, to improve efficiency of performing global processing by the machine learning system or improve accuracy of a global processing result obtained by the machine learning system.

In a possible implementation, the local processing time includes time required by the plurality of second nodes to separately perform local training or local inference, and the uploading time includes time required by the plurality of second nodes to separately upload local training results or local inference results.

In this possible implementation, for machine learning systems using different machine learning algorithms, meanings separately represented by the local processing time and the uploading time are shown. For example, for a machine learning system using a federated learning algorithm, the local processing time includes time required by the plurality of second nodes to separately perform local training, and the uploading time includes time required by the plurality of second nodes to separately upload local training results. However, for a machine learning system using a distributed learning algorithm, the local processing time includes time required by the plurality of second nodes to separately perform local inference, and the uploading time includes time required by the plurality of second nodes to separately upload local inference results.

In another possible implementation, that the first node sorts sequence numbers of the plurality of second nodes based on the local processing time and the uploading time, to obtain a first sequence includes: First, the first node randomly selects M second nodes from N second nodes, where M is an integer greater than 1 and less than or equal to N, and N is an integer greater than 1. Then, the first node sorts sequence numbers of the M second nodes based on local processing time and uploading time separately corresponding to the M second nodes, to obtain the first sequence.

In this possible implementation, the first node first randomly selects the M second nodes from the N second nodes, and then determines the first sequence based on the local processing time and the uploading time of the M second nodes. This avoids a problem that when channel conditions and computing capabilities of the second nodes are given, the first node schedules same second nodes and schedules the second nodes in a same order each time. This further improves accuracy of a global processing result obtained by the first node by performing global processing based on local processing results fed back by the scheduled second nodes.

In another possible implementation, that the first node sorts sequence numbers of the plurality of second nodes based on the local processing time and the uploading time, to obtain a first sequence includes: First, the first node sorts the sequence numbers of the plurality of second nodes based on the local processing time and the uploading time, to obtain a third sequence. Then, the first node randomly selects M sequence numbers from N sequence numbers included in the third sequence, where M is an integer greater than 1 and less than or equal to N, and N is an integer greater than 1. The first node sequentially sorts the M sequence numbers based on an order of the M sequence numbers in the third sequence, to obtain the first sequence.

In this possible implementation, the first node first sorts the plurality of second nodes, to obtain the third sequence. Then, the first node randomly selects the M sequence numbers from the third sequence, and then sorts the M sequence numbers. This avoids a problem that when channel conditions and computing capabilities of the second nodes are given, the first node schedules same second nodes and schedules the second nodes in a same order each time. This further improves accuracy of a global processing result obtained by the first node by performing global processing based on local processing results fed back by the scheduled second nodes. In addition, the first node sorts the sequence numbers of the plurality of second nodes in each round. When second nodes in a current round executed by the machine learning system are the same as second nodes in a previous round executed by the machine learning system, a third sequence obtained in the previous round may be directly used, to avoid computation overheads caused by reordering.

In another possible implementation, the sequence numbers of the second nodes in the first sequence are sorted in ascending order of the local processing time, and sequence numbers of second nodes with same local processing time in the first sequence are sorted in ascending order of the uploading time.

In this possible implementation, a specific manner in which the first node determines the first sequence with reference to the local processing time and the uploading time is shown, to help the first node subsequently determine the second sequence based on the first sequence.

In another possible implementation, that the first node determines a second sequence based on the first sequence includes:

The first node selects sequence numbers off second nodes from the first sequence, to obtain the second sequence.

An order of the sequence numbers corresponding to the f second nodes in the first sequence is the same as an order of the sequence numbers corresponding to the f second nodes in the second sequence. f is a maximum value that meets a first condition, and the first condition includes: a sum of first time and largest local processing time in local processing time of the f second nodes is less than or equal to preset maximum processing time.

The first time is equal to a sum of uploading time separately corresponding to the f second nodes minus overlapping time between the largest local processing time and the uploading time of the f second nodes, and f is an integer greater than 1.

In this possible implementation, a specific process in which the first node determines the second sequence is shown. In a serial scheduling system, when time required for each round is set to the preset maximum processing time, and a weight of each second node is the same, the first node determines the second sequence in the foregoing manner, and then schedules the second nodes based on the second sequence. In this way, the first node may select a maximum of second nodes in each round to feed back corresponding local processing results to the first node. In a process of each round, if more second nodes participate in local processing and feed back corresponding local processing results, accuracy of a global processing result obtained by the first node is higher.

In another possible implementation, that the first node determines a second sequence based on the first sequence includes:

The first node determines, according to a recursive algorithm, sequence numbers of e second nodes and an order of the e second nodes based on the first sequence, weights of the plurality of second nodes, the local processing time of the plurality of second nodes, and the uploading time of the plurality of second nodes, where e is an integer greater than 1.

The e second nodes meet a second condition, and the second condition includes that an obtained sum of weights of the e second nodes is maximum when time required by the first node to collect local processing results fed back by the e second nodes is less than or equal to preset maximum processing time.

The first node determines the second sequence based on the sequence numbers of the e second nodes and the order of the e second nodes.

In this possible implementation, another specific process in which the first node determines the second sequence is shown. In a serial scheduling system, when time required by the machine learning system to execute a round is set to be greater than 0 and less than or equal to the preset maximum processing time, the first node determines the second sequence in the foregoing manner, and then schedules the second nodes based on the second sequence. The first node may select a plurality of second nodes with a largest sum of weights in each round to feed back corresponding local processing results to the first node. If the sum of weights of the second nodes that participate in local processing and feed back the local processing results in each round is higher, accuracy of a global processing result obtained by the first node is higher.

In another possible implementation, that the first node schedules second nodes corresponding to the sequence numbers included in the second sequence includes:

The first node schedules, based on an order of the second node sequence numbers in the second sequence, the second nodes corresponding to the sequence numbers included in the second sequence.

In this possible implementation, a specific method in which the first node schedules the second nodes based on the second sequence is shown. The method is mainly applied to the serial scheduling system. In the serial scheduling system, when the time required for each round is set to the preset maximum processing time, and the weight of each second node is the same, the first node schedules the second nodes based on the second sequence. In this way, the first node may select a maximum of second nodes in each round to feed back corresponding local processing results to the first node. In the process of each round, if more second nodes participate in local processing and feed back corresponding local processing results, accuracy of a global processing result obtained by the first node is higher. In the serial scheduling system, when the time required by the machine learning system to execute a round is set to be greater than 0 and less than or equal to the preset maximum processing time, the first node schedules the second nodes based on the second sequence. The first node may select the plurality of second nodes with the largest sum of weights in each round to feed back the corresponding local processing results to the first node. If the sum of the weights of the second nodes that participate in the local processing and feed back the local processing results in each round is higher, the accuracy of the global processing result obtained by the first node is higher.

In another possible implementation, the second sequence includes a sequence number $a_i$ of the second node, $i \in [1, X]$, X is a quantity of second node sequence numbers in the second sequence, i is an integer, and X is an integer greater than 1. A sequence number of an $a_i^{th}$ second node is before a sequence number of an $a_{i+1}^{th}$ second node. That the first node schedules, based on an order of the second node sequence numbers in the second sequence, the second nodes corresponding to the sequence numbers included in the second sequence includes: The first node sends a first uploading indication to the $a_i^{th}$ second node, where the first uploading indication indicates the $a_i^{th}$ second node to upload a first local processing result. The first node receives the first local processing result from the $a_i^{th}$ second node. The first node sends a second uploading indication to the $a_{i+1}^{th}$ second node, where the second uploading indication indicates the $a_{i+1}^{th}$ second node to upload a second local processing result. The first node receives the second local processing result from the $a_{i+1}^{th}$ second node.

In this possible implementation, a specific process in which the first node sequentially schedules, based on the order of the sequence numbers included in the second sequence, the second nodes corresponding to the sequence numbers included in the second sequence is shown.

In another possible implementation, that the first node sorts sequence numbers of the plurality of second nodes based on the local processing time and the uploading time, to obtain a first sequence includes: The first node determines, based on the local processing time, the uploading time, and first processing time, a bandwidth pre-allocation ratio value that is of each of the plurality of second nodes and that corresponds to the first processing time, where the first processing time is less than or equal to preset maximum processing time. The first node determines, based on the bandwidth pre-allocation ratio value, the first sequence corresponding to the first processing time. Sequence numbers included in the first sequence are obtained by sequentially sorting the sequence numbers of the plurality of second nodes based on bandwidth pre-allocation values corresponding to the plurality of second nodes.

In this possible implementation, another specific manner in which the first node determines the first sequence with reference to the local processing time and the uploading time is shown, to help the first node subsequently determine the second sequence based on the first sequence.

In another possible implementation, a bandwidth pre-allocation ratio value corresponding to a $p^{th}$ second node in the plurality of second nodes is equal to $C_p/(T-D_p)$, $C_p$ is uploading time of the $p^{th}$ second node, T is the first processing time, $D_p$ is local processing time of the $p^{th}$ second node, and p is an integer greater than or equal to 1.

In this possible implementation, a specific manner of calculating the bandwidth pre-allocation ratio value of the second node is shown, to provide a basis for the second node to subsequently determine the second sequence based on the first sequence.

In another possible implementation, there is one piece of first processing time, and that the first node determines a second sequence based on the first sequence includes: The first node uses a bandwidth pre-allocation ratio value that is of each second node and that corresponds to the first processing time as a bandwidth allocation ratio value that is of each second node and that corresponds to the first processing time. The first node determines the second sequence in the first sequence based on the bandwidth allocation ratio value that is of each second node and that corresponds to the first processing time. The second sequence includes sequence numbers of q second nodes in the first sequence. An order of the sequence numbers corresponding to the q second nodes in the first sequence is the same as an order of the sequence numbers corresponding to the q second nodes in the second sequence. q is a maximum value that meets a third condition, and the third condition includes: a sum of bandwidth allocation ratio values that are separately of the q second nodes and that correspond to the first processing time is less than or equal to 1, and a sum of local processing time and uploading time of a second node with a largest sum of local processing time and uploading time in the q second nodes is less than or equal to the first processing time.

In this possible implementation, another specific process in which the first node determines the second sequence is shown. In a parallel scheduling system, when accuracy of a global processing result obtained by the first node after a plurality of rounds is required to be greater than or equal to preset accuracy, and time required by the machine learning system to execute a round is set to be greater than 0 and less than or equal to the preset maximum processing time, the first node determines the second sequence in the foregoing manner, and then schedules the second nodes based on the second sequence, so that time required by the machine learning system to execute each round is minimized.

In another possible implementation, there are b pieces of first processing time, b is an integer greater than 1, and the b pieces of first processing time separately correspond to b first sequences. Sequence numbers included in an $r^{th}$ first sequence in the b first sequences are obtained by sequentially sorting the sequence numbers of the plurality of second nodes based on $r^{th}$ bandwidth pre-allocation ratio values separately corresponding to the plurality of second nodes. An $r^{th}$ bandwidth pre-allocation ratio value of each of the plurality of second nodes is determined based on an $r^{th}$ piece of first processing time in the b pieces of first processing time, local processing time of each second node, and uploading time of each second node.

That the first node determines a second sequence based on the first sequence includes: The first node uses b bandwidth pre-allocation ratio values that are of each second node and that correspond to the b pieces of first processing time as b bandwidth allocation ratio values that are of each second node and that correspond to the b pieces of first processing time. The first node determines b fourth sequences based on the b first sequences and the b bandwidth allocation ratio values that are of each second node and that correspond to the b pieces of first processing time. An $r^{th}$ fourth sequence in the b fourth sequences includes sequence numbers of x second nodes in the $r^{th}$ first sequence in the b first sequences. An order of the sequence numbers corresponding to the x second nodes in the $r^{th}$ first sequence is the same as an order of the sequence numbers corresponding to the x second nodes in the $r^{th}$ fourth sequence.

x is a maximum value that meets a fourth condition, and the fourth condition includes: a sum of $r^{th}$ bandwidth allocation ratio values that are separately of the x second nodes and that correspond to the $r^{th}$ piece of first processing time is less than or equal to 1, and a sum of local processing time and uploading time of a second node with a largest sum of local processing time and uploading time in the x second nodes is less than or equal to the $r^{th}$ piece of first processing time.

The first node selects a $k^{th}$ fourth sequence from the b fourth sequences, and uses the $k^{th}$ fourth sequence as the second sequence, where k is an integer greater than or equal to 1 and less than or equal to b.

The $k^{th}$ fourth sequence is a fourth sequence that meets a fifth condition.

The fifth condition includes that a sum of local processing time of a third node and uploading time of the third node is less than a sum of local processing time of any fourth node and uploading time of the fourth node.

The third node is a second node with a largest sum of local processing time and uploading time in second nodes corresponding to sequence numbers included in the $k^{th}$ fourth sequence.

The fourth node is a second node with a largest sum of local processing time and uploading time in second nodes corresponding to sequence numbers included in any one of b−1 fourth sequences, and the b−1 fourth sequences include a fourth sequence, in the b fourth sequences, other than the $k^{th}$ fourth sequence.

Bandwidth allocation ratio values of the second nodes corresponding to the sequence numbers included in the $k^{th}$ fourth sequence are $k^{th}$ bandwidth allocation ratios that are separately of the second nodes corresponding to the sequence numbers included in the $k^{th}$ fourth sequence and that correspond to a $k^{th}$ piece of first processing time in the b pieces of first processing time.

In this possible implementation, a specific process in which the first node determines a plurality of first sequences corresponding to a plurality of pieces of first processing time, determines a plurality of fourth sequences, and selects the second sequence from the plurality of fourth sequences for a case of the plurality of pieces of first processing time is shown. In a parallel scheduling system, when accuracy of a global processing result obtained by the first node after a plurality of rounds is required to be greater than or equal to preset accuracy, and time required by the machine learning system to execute a round is set to be greater than 0 and less than or equal to the preset maximum processing time, the first node determines the second sequence in the foregoing manner, and then schedules the second nodes based on the second sequence, so that time required by the machine learning system to execute each round is minimized.

In another possible implementation, that the first node schedules second nodes corresponding to the sequence numbers included in the second sequence includes:

The first node delivers third uploading indications to the second nodes corresponding to the sequence numbers included in the second sequence, where the third uploading indications indicate the second nodes corresponding to the sequence numbers included in the second sequence to separately report corresponding local processing results. Then, the first node receives the local processing results separately sent by the second nodes corresponding to the sequence numbers included in the second sequence.

In this possible implementation, another manner in which the first node schedules the second nodes based on the second sequence is shown, and the manner is mainly applied to the parallel scheduling system. In the parallel scheduling system, when the accuracy of the global processing result obtained by the first node after the plurality of rounds is required to be greater than or equal to the preset accuracy, and the time required by the machine learning system to execute a round is set to be greater than 0 and less than or equal to the preset maximum processing time, the first node schedules the second nodes based on the second sequence, so that the time required by the machine learning system to execute each round is minimized.

In another possible implementation, the method further includes: The first node determines, based on bandwidth allocation ratios of the second nodes corresponding to the sequence numbers included in the second sequence, a location and a size of a time-frequency resource of each second node in the second nodes corresponding to the sequence numbers included in the second sequence. That the first node delivers third uploading indications to the second nodes corresponding to the sequence numbers included in the second sequence includes: The first node delivers the third uploading indications to the second nodes corresponding to the sequence numbers included in the second sequence, where the third uploading indications include location information of the time-frequency resource and size information of the time-frequency resource.

In this possible implementation, the first node sends, by using the third uploading indications, location information and size information of corresponding time-frequency resources to the second nodes corresponding to the sequence numbers included in the second sequence. In this way, the second nodes corresponding to the sequence numbers included in the second sequence can determine locations and sizes of the time-frequency resources corresponding to the second nodes. The second nodes corresponding to the sequence numbers included in the second sequence may feed back corresponding local processing results to the first node at the corresponding time-frequency resource locations.

In another possible implementation, the method further includes: The first node receives computing capability information from the plurality of second nodes. The first node determines channel condition information separately corresponding to the first node and the plurality of second nodes.

That the first node obtains local processing time separately corresponding to the plurality of second nodes and uploading time separately corresponding to the plurality of second nodes includes: The first node determines the local processing time of the plurality of second nodes and the uploading time of the plurality of second nodes based on the computing capability information and the channel condition information.

In this possible implementation, a specific manner in which the first node determines the computing capability information and the channel condition information of the second nodes is provided, to provide a basis for implementing the solutions.

According to a second aspect in embodiments of this application, a communication apparatus is provided. Communication connections are established between the communication apparatus and a plurality of second nodes, and the communication apparatus includes: an obtaining unit, configured to obtain local processing time separately corresponding to the plurality of second nodes and/or uploading time of local processing results separately corresponding to the plurality of second nodes; a sorting unit, configured to sort sequence numbers of the plurality of second nodes based on the local processing time and/or the uploading time, to obtain a first sequence; a determining unit, configured to determine a second sequence based on the first sequence, where the second sequence includes some or all second node sequence numbers in the first sequence; and a scheduling unit, configured to schedule second nodes corresponding to the sequence numbers included in the second sequence.

In a possible implementation, the local processing time includes time required by the plurality of second nodes to separately perform local training or local inference, and the uploading time includes time required by the plurality of second nodes to separately upload local training results or local inference results.

In another possible implementation, the sorting unit is specifically configured to:

randomly select M second nodes from N second nodes, where M is an integer greater than 1 and less than or equal to N, and N is an integer greater than 1; and sort sequence numbers of the M second nodes based on local processing time and uploading time separately corresponding to the M second nodes, to obtain the first sequence.

In another possible implementation, the sorting unit is specifically configured to:

sort the sequence numbers of the plurality of second nodes based on the local processing time and the uploading time, to obtain a third sequence; randomly select M sequence numbers from N sequence numbers included in the third sequence, where M is an integer greater than 1 and less than or equal to N, and N is an integer greater than 1; and sequentially sort the M sequence numbers based on an order of the M sequence numbers in the third sequence, to obtain the first sequence.

In another possible implementation, the sequence numbers of the second nodes in the first sequence are sorted in ascending order of the local processing time, and sequence numbers of second nodes with same local processing time in the first sequence are sorted in ascending order of the uploading time.

In another possible implementation, the determining unit is specifically configured to:

select sequence numbers off second nodes from the first sequence, to obtain the second sequence. An order of the sequence numbers corresponding to the f second nodes in the first sequence is the same as an order of the sequence numbers corresponding to the f second nodes in the second sequence. f is a maximum value that meets a first condition, and the first condition includes: a sum of first time and largest local processing time in local processing time of the f second nodes is less than or equal to preset maximum processing time. The first time is equal to a sum of uploading time separately corresponding to the f second nodes minus overlapping time between the largest local processing time and the uploading time of the f second nodes, and f is an integer greater than 1.

In another possible implementation, the determining unit is specifically configured to:

determine, according to a recursive algorithm, sequence numbers of e second nodes and an order of the e second nodes based on the first sequence, weights of the plurality of second nodes, the local processing time of the plurality of second nodes, and the uploading time of the plurality of second nodes, where e is an integer greater than 1; and the e second nodes meet a second condition, and the second condition includes that an obtained sum of weights of the e second nodes is maximum when time required by the communication apparatus to collect local processing results fed back by the e second nodes is less than or equal to preset maximum processing time; and determine the second sequence based on the sequence numbers of the e second nodes and the order of the e second nodes.

In another possible implementation, the scheduling unit is specifically configured to:

schedule, based on an order of the second node sequence numbers in the second sequence, the second nodes corresponding to the sequence numbers included in the second sequence.

In another possible implementation, the second sequence includes a sequence number $a_i$ of the second node, $i \in [1, X]$, X is a quantity of second node sequence numbers in the second sequence, i is an integer, and X is an integer greater than 1.

A sequence number of an $a_i^{th}$ second node is before a sequence number of an $a_{i+1}^{th}$ second node. The scheduling unit is specifically configured to:

send a first uploading indication to the $a_i^{th}$ second node, where the first uploading indication indicates the $a_i^{th}$ second node to upload a first local processing result; receive the first local processing result from the $a_i^{th}$ second node; send a second uploading indication to the $a_{i+1}^{th}$ second node, where the second uploading indication indicates the $a_{i+1}^{th}$ second node to upload a second local processing result; and receive the second local processing result from the $a_{i+1}^{th}$ second node.

In another possible implementation, the sorting unit is specifically configured to:

determine, based on the local processing time, the uploading time, and first processing time, a bandwidth pre-allocation ratio value that is of each of the plurality of second nodes and that corresponds to the first processing time, where the first processing time is less than or equal to preset maximum processing time; and determine, based on the bandwidth pre-allocation ratio value, the first sequence corresponding to the first processing time. Sequence numbers included in the first sequence are obtained by sequentially sorting the sequence numbers of the plurality of second nodes based on bandwidth pre-allocation values corresponding to the plurality of second nodes.

In another possible implementation, a bandwidth pre-allocation ratio value corresponding to a $p^{th}$ second node in the plurality of second nodes is equal to $C_p/(T-D_p)$, $C_p$ is uploading time of the $p^{th}$ second node, T is the first processing time, $D_p$ is local processing time of the $p^{th}$ second node, and p is an integer greater than or equal to 1.

In another possible implementation, there is one piece of first processing time, and the determining unit is specifically configured to:

use a bandwidth pre-allocation ratio value that is of each second node and that corresponds to the first processing time as a bandwidth allocation ratio value that is of each second node and that corresponds to the first processing time; and determine the second sequence in the first sequence based on the bandwidth allocation ratio value that is of each second node and that corresponds to the first processing time. The second sequence includes sequence numbers of q second nodes in the first sequence. An order of the sequence numbers corresponding to the q second nodes in the first sequence is the same as an order of the sequence numbers corresponding to the q second nodes in the second sequence. q is a maximum value that meets a third condition, and the third condition includes: a sum of bandwidth allocation ratio values that are separately of the q second nodes and that correspond to the first processing time is less than or equal to 1, and a sum of local processing time and uploading time of a second node with a largest sum of local processing time and uploading time in the q second nodes is less than or equal to the first processing time.

In another possible implementation, there are b pieces of first processing time, b is an integer greater than 1, and the b pieces of first processing time separately correspond to b first sequences. Sequence numbers included in an $r^{th}$ first sequence in the b first sequences are obtained by sequentially sorting the sequence numbers of the plurality of second nodes based on $r^{th}$ bandwidth pre-allocation ratio values separately corresponding to the plurality of second nodes. An $r^{th}$ bandwidth pre-allocation ratio value of each of the plurality of second nodes is determined based on an $r^{th}$ piece of first processing time in the b pieces of first processing time, local processing time of each second node, and uploading time of each second node.

The determining unit is specifically configured to:

use b bandwidth pre-allocation ratio values that are of each second node and that correspond to the b pieces of first processing time as b bandwidth allocation ratio values that are of each second node and that correspond to the b pieces of first processing time;

determine b fourth sequences based on the b first sequences and the b bandwidth allocation ratio values that are of each second node and that correspond to the b pieces of first processing time, where an $r^{th}$ fourth sequence in the b fourth sequences includes sequence numbers of x second nodes in the $r^{th}$ first sequence in the b first sequences; an order of the sequence numbers corresponding to the x second nodes in the $r^{th}$ first sequence is the same as an order of the sequence numbers corresponding to the x second nodes in the $r^{th}$ fourth sequence; and x is a maximum value that meets a fourth condition, and the fourth condition includes: a sum of $r^{th}$ bandwidth allocation ratio values that are separately of the x second nodes and that correspond to the $r^{th}$ piece of first processing time is less than or equal to 1, and a sum of local processing time and uploading time of a second node with a largest sum of local processing time and uploading time in the x second nodes is less than or equal to the $r^{th}$ piece of first processing time; and select a $k^{th}$ fourth sequence from the b fourth sequences, and use the $k^{th}$ fourth sequence as the second sequence, where k is an integer greater than or equal to 1 and less than or equal to b.

The $k^{th}$ fourth sequence is a fourth sequence that meets a fifth condition. The fifth condition includes that a sum of local processing time of a third node and uploading time of the third node is less than a sum of local processing time of any fourth node and uploading time of the fourth node. The third node is a second node with a largest sum of local processing time and uploading time in second nodes corresponding to sequence numbers included in the $k^{th}$ fourth sequence. The fourth node is a second node with a largest sum of local processing time and uploading time in second nodes corresponding to sequence numbers included in any one of b−1 fourth sequences, and the b−1 fourth sequences include a fourth sequence, in the b fourth sequences, other than the $k^{th}$ fourth sequence.

Bandwidth allocation ratio values of the second nodes corresponding to the sequence numbers included in the $k^{th}$ fourth sequence are $k^{th}$ bandwidth allocation ratios that are separately of the second nodes corresponding to the sequence numbers included in the $k^{th}$ fourth sequence and that correspond to a $k^{th}$ piece of first processing time in the b pieces of first processing time.

In another possible implementation, the scheduling unit is specifically configured to:

deliver third uploading indications to the second nodes corresponding to the sequence numbers included in the second sequence, where the third uploading indications indicate the second nodes corresponding to the sequence numbers included in the second sequence to separately report corresponding local processing results; and receive the local processing results separately sent by the second nodes corresponding to the sequence numbers included in the second sequence.

In another possible implementation, the determining unit is further configured to: determine, based on bandwidth allocation ratios of the second nodes corresponding to the sequence numbers included in the second sequence, a location and a size of a time-frequency resource of each second node in the second nodes corresponding to the sequence numbers included in the second sequence.

The scheduling unit is further configured to: deliver the third uploading indications to the second nodes corresponding to the sequence numbers included in the second sequence, where the third uploading indications include location information of the time-frequency resource and size information of the time-frequency resource.

In another possible implementation, the scheduling unit is further configured to:

receive computing capability information from the plurality of second nodes; the determining unit is further configured to determine channel condition information separately corresponding to the communication apparatus and the plurality of second nodes; and the obtaining unit is specifically configured to: determine the local processing time of the plurality of second nodes and the uploading time of the plurality of second nodes based on the computing capability information and the channel condition information.

According to a third aspect of this application, a communication apparatus is provided. The communication apparatus includes a processor and a memory. The memory stores a computer program or computer instructions, and the processor is further configured to invoke and run the computer program or the computer instructions stored in the memory, so that the processor implements any implementation of the first aspect.

Optionally, the communication apparatus further includes a transceiver, and the processor is configured to control the transceiver to receive and send signals.

According to a fourth aspect in embodiments of this application, a computer program product including computer instructions is provided. When the computer program product runs on a computer, any implementation of the first aspect is performed.

According to a fifth aspect in embodiments of this application, a computer-readable storage medium is provided, where the computer-readable storage medium includes computer instructions. When the computer instructions are run on a computer, any implementation of the first aspect is performed.

According to a sixth aspect in embodiments of this application, a chip apparatus is provided. The chip apparatus includes a processor, configured to: be connected to a memory, and invoke a program stored in the memory, to enable the processor to perform any implementation of the first aspect.

According to a seventh aspect in embodiments of this application, a node scheduling system is provided. The node scheduling system includes the communication apparatus and the plurality of second nodes according to the second aspect.

It can be learned from the foregoing technical solutions that the node scheduling method provided in embodiments of this application is applied to a machine learning system. The machine learning system includes a first node and a plurality of second nodes. Communication connections are established between the first node and the plurality of second nodes. The first node obtains local processing time separately corresponding to the plurality of second nodes and/or uploading time separately corresponding to the plurality of second nodes. Then, the first node sorts sequence numbers of the plurality of second nodes based on the local processing time separately corresponding to the plurality of second nodes and the uploading time separately corresponding to the plurality of second nodes, to obtain a first sequence. The first node determines a second sequence based on the first sequence. The second sequence includes some or all second node sequence numbers in the first sequence. The first node schedules second nodes corresponding to the sequence numbers included in the second sequence. It can be learned that the first node selects and schedules some second nodes based on the local processing time of the plurality of second nodes and the uploading time of the plurality of second nodes, to optimize a scheduling manner of selecting and scheduling the second nodes by the first node. Further, the first node may perform global processing with reference to local processing results fed back by the second nodes. In this way, efficiency of performing global processing by the first node can be improved, or accuracy of a global processing result obtained by the first node can be improved.

BRIEF DESCRIPTION OF THE DRAWINGS

FIG. 5A is another schematic interaction diagram of a node scheduling method according to an embodiment of this application;

FIG. 6A is another schematic interaction diagram of a node scheduling method according to an embodiment of this application;

FIG. 7A is another schematic interaction diagram of a node scheduling method according to an embodiment of this application;

DETAILED DESCRIPTION OF ILLUSTRATIVE EMBODIMENTS

Embodiments of this application provide a node scheduling method and an apparatus, to implement scheduling of a first node on a second node.

A network architecture and a service scenario described in embodiments of this application are intended to describe technical solutions of embodiments of this application more clearly, and do not constitute a limitation on the technical solutions provided in embodiments of this application. Persons of ordinary skill in the art may know: With evolution of the network architecture and emergence of new service scenarios, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment, but instead mean "one or more but not all embodiments", unless otherwise specifically emphasized in another manner. Terms "include", "comprise", "have", and other variants thereof all mean "include but are not limited to", unless otherwise specifically emphasized in another manner.

In this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Figure 1:
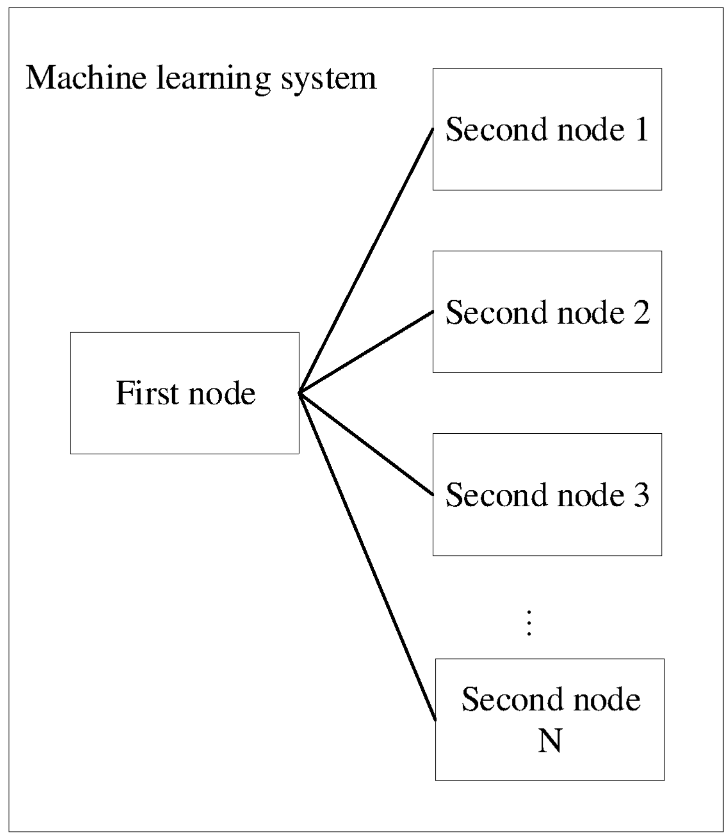
FIG. 1 is a schematic diagram of a machine learning system according to an embodiment of this application.

FIG. 1 is a schematic diagram of a machine learning system according to an embodiment of this application. In FIG. 1, the machine learning system includes a first node and a plurality of second nodes. The plurality of second nodes include a second node 1 to a second node N, where N is an integer greater than 1. The first node establishes communication connections to the plurality of second nodes.

The machine learning system shown in FIG. 1 may include but is not limited to a federated learning (FL) system and a distributed learning system.

For example, the machine learning system shown in FIG. 1 is a federated learning system. In this case, the first node may be referred to as a central node, and the plurality of second nodes may be referred to as a plurality of client nodes.

[ono] For example, the machine learning system shown in FIG. 1 is a distributed learning system. In this case, the first node may be referred to as a central node, and the plurality of second nodes may be referred to as a plurality of distributed nodes.

In this embodiment of this application, the machine learning system shown in FIG. 1 may be deployed in a communication system. The communication system includes but is not limited to a narrowband internet of things (NB-IoT) system, a long term evolution (LTE) system, a 5th generation (5G) mobile communication system (for example, an enhanced mobile broadband (eMBB), ultra-reliable low-latency communication (URLLC), and enhanced machine type communication (eMTC) application scenario of the 5G mobile communication system), a mobile communication system after a 5G network, or a satellite communication system.

Figure 2A:
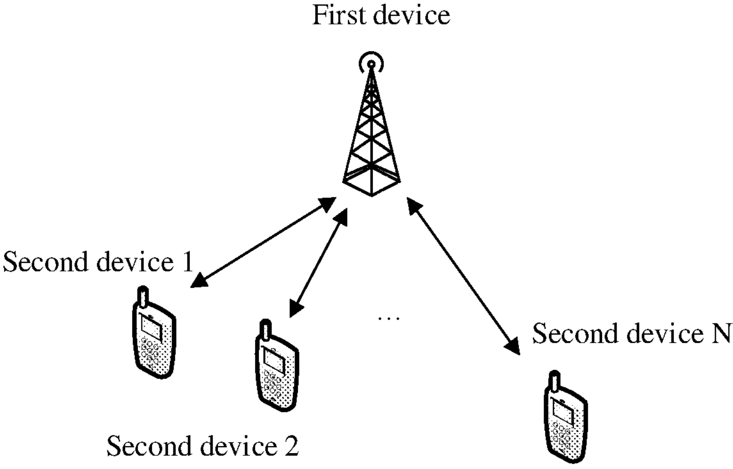
FIG. 2A is a schematic diagram of a communication system to which a node scheduling method is applied according to an embodiment of this application.

The following shows a possible communication system with reference to FIG. 2A. FIG. 2A is a schematic diagram of the communication system according to an embodiment of this application. The communication system includes a first device and a plurality of second devices (for example, a second device 1, a second device 2, . . . , and a second device N). Communication connections are established between the first device and the plurality of second devices.

In some possible implementations, the first device may be a network device, a server, a coordinating terminal, or the like. This is not specifically limited in this application. The second device may be a terminal device.

The machine learning system shown in FIG. 1 may be deployed in the communication system. The first node in the machine learning system may be the first device in the communication system, and the plurality of second nodes in the machine learning system may be the plurality of second devices in the communication system. For example, the second node 1 is the first device 1 shown in FIG. 2A, a second node 2 is the second device 2 shown in FIG. 2A, . . . , and the second node N is the second device N shown in FIG. 2A.

In this application, the network device is an apparatus that is deployed in a radio access network and that provides a wireless communication function for the terminal device. The network device includes a macro base station, a micro base station, a relay station, and an access network point in various forms. For example, the base station in embodiments of this application may be a base station, a transmission reception point (TRP), a transmission point (TP), or a next generation NodeB (ngNB) in a new radio (NR) system, or may be an evolved NodeB (eNB or eNodeB) in a long term evolution (LTE) system, or may be a device that bears a base station function in device-to-device (DD), vehicle-to-everything (VX), machine-to-machine (MM), or internet of things communication.

In this application, the terminal device may include various handheld devices, user equipment, vehicle-mounted devices, wearable devices, or computing devices that have a wireless communication function, or other processing devices connected to a wireless modem. The terminal device may be user equipment (UE), a subscriber unit, a cellular phone, a smartphone, a wireless data card, a personal digital assistant (PDA) computer, a tablet computer, a wireless modem, a handheld device, a laptop computer, a machine type communication (MTC) terminal, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a terminal device in a 5G network, a terminal device in a future communication network, or the like.

In this application, the machine learning system shown in FIG. 1 may be further applied to a mobile edge computing (MEC) communication system. The communication system may include a first node and a plurality of second nodes.

MEC is a technology that deeply integrates a mobile access network and an internet service. By using a radio access network to provide a required network service and a cloud computing function for a user nearby, MEC may be a carrier-class service environment with high performance, low latency, and high bandwidth, and can accelerate fast download of various content, services, and applications in a network, so that the user can enjoy uninterrupted high-quality network experience.

Figure 2B:
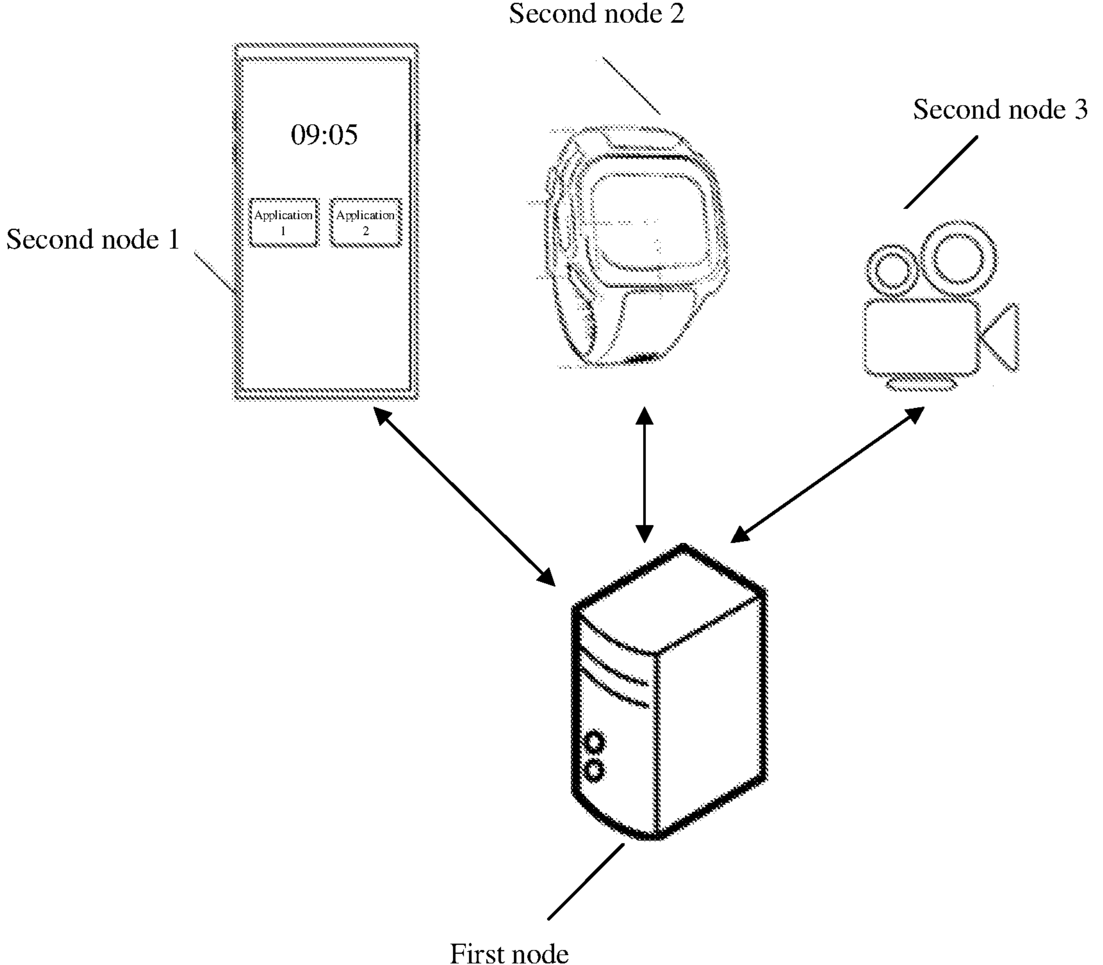
FIG. 2B is another schematic diagram of a communication system to which a node scheduling method is applied according to an embodiment of this application.

The first node in FIG. 2B may be an edge server in the mobile edge computing system. For example, the edge server can be configured to implement data collection, data fusion, and data storage of an edge electronic device, is configured with an artificial intelligence (AI) algorithm, can perform AI training in an edge learning scenario to obtain a local model, and perform processing such as model fusion and update based on local models obtained by the plurality of second nodes through training.

The plurality of second nodes are edge electronic devices. For example, the edge electronic device may collect data, so that a second node or some second nodes having a training function can perform training based on a large amount of data, to obtain a corresponding local model, to provide a service such as decision making or AI computing for a user.

Specifically, the second node may include the terminal device shown in FIG. 2A. The second node may include a camera for collecting video and image information, a sensing device for collecting perception information, and the like. Alternatively, the second node may further include an electronic device having a simple computing capability, for example, a vehicle-mounted electronic device, a smartwatch, a smart speaker, or a wearable device. Alternatively, the second node may further include an electronic device having a strong computing capability and a high communication requirement, for example, a computer, a notebook computer, a tablet computer, or a smartphone.

FIG. 2A and FIG. 2B are merely two possible examples, and are not intended to limit the technical solutions of this application. Persons skilled in the art should understand that, in a specific implementation process, the machine learning system may further include another device, and a device type of the first node or the second node, a quantity of first nodes or second nodes, and the like may also be determined based on a specific requirement.

Optionally, the first node or the second node shown in FIG. 1 may be an electronic device or a functional module in an electronic device. It may be understood that the foregoing function may be a network element in a hardware device, for example, a communication chip in a mobile phone, or may be a software function running on dedicated hardware, or a virtualized function instantiated on a platform (for example, a cloud platform).

In addition, in addition to being deployed in the communication system, the machine learning system in this application may be further deployed on an electronic device. In other words, in an implementation, the first node and the plurality of second nodes in the machine learning system shown in FIG. 1 may alternatively be integrated into a same electronic device, for example, a server or a storage device. An implementation of the machine learning system is not specifically limited in this application.

Conventional centralized learning requires each edge node to centrally transmit local data to a central node. The central node performs training and learning by using the collected local data of each edge node. To resolve problems of a communication loss and a high requirement on a computing capability of the central node that are caused by data transmission between nodes, the central device selects some edge nodes from a plurality of edge nodes, and schedules the edge nodes to obtain local data of the edge nodes. Then, the central node performs training and learning with reference to the local data of the edge nodes.

When communication resources and computing resources are limited, a manner of selecting and scheduling the nodes needs to be optimized. Therefore, how to optimize the manner of selecting and scheduling the node is a main technical problem to be resolved in this application.

The following describes the technical solutions in embodiments of this application with reference to specific embodiments.

Figure 3:
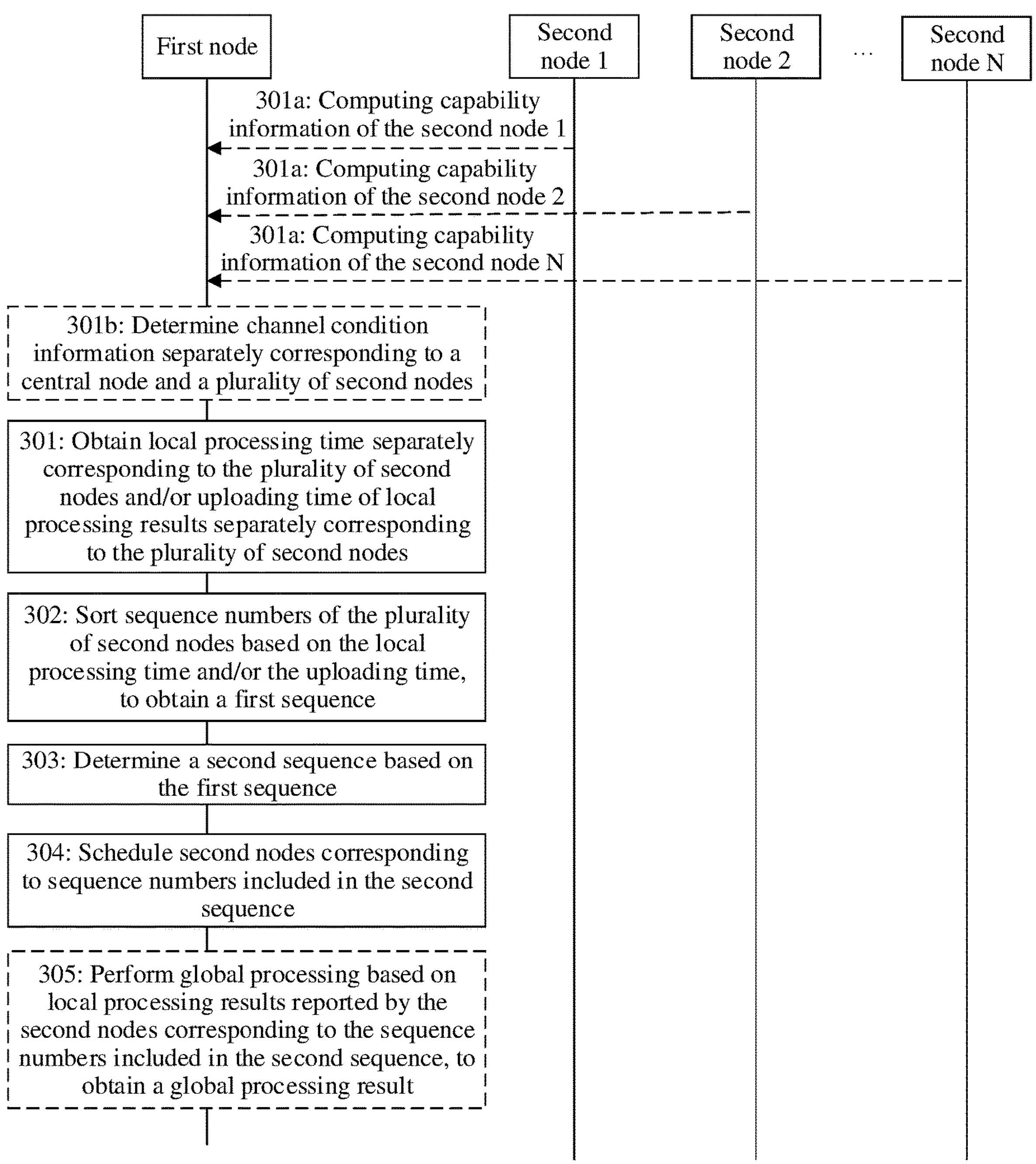
FIG. 3 is a schematic interaction diagram of a node scheduling method according to an embodiment of this application.

FIG. 3 is a schematic interaction diagram of a node scheduling method according to an embodiment of this application. In FIG. 3, the node scheduling method specifically includes the following steps.

301: A first node obtains local processing time separately corresponding to a plurality of second nodes and/or uploading time of local processing results separately corresponding to the plurality of second nodes.

The first node establishes communication connections to the plurality of second nodes.

In this embodiment, optionally, the node scheduling method is applied to a machine learning system. The machine learning system includes the first node and the plurality of second nodes. The first node establishes the communication connections to the plurality of second nodes.

The machine learning system may be a federated learning system, a distributed learning system, or another type of machine learning algorithm system. This is not specifically limited in this application.

1. If the machine learning system is a federated learning system, the local processing time separately corresponding to the plurality of second nodes is local training time required by the plurality of second nodes to separately perform local training. The uploading time of the local processing results separately corresponding to the plurality of second nodes is uploading time required by the plurality of second nodes to separately upload local training results.

The local training time required by the plurality of second nodes to separately perform local training includes: time required by the plurality of second nodes to separately perform local training based on a global model delivered by the first node and local data separately corresponding to the plurality of second nodes to obtain the local training results.

Specifically, when the machine learning system is a federated learning system, the first node may be referred to as a central node, and the plurality of second nodes may be referred to as a plurality of client nodes.

2. If the machine learning system is a distributed learning system, the local processing time separately corresponding to the plurality of second nodes is local inference time required by the plurality of second nodes to separately perform local inference. The uploading time of the local processing results separately corresponding to the plurality of second nodes is uploading time required by the plurality of second nodes to separately upload local inference results.

The local inference time required by the plurality of second nodes to separately perform local inference includes: time required by the plurality of second nodes to separately perform local inference based on data subsets correspondingly delivered by the first node and preset models in the plurality of second nodes to obtain the local inference results.

Specifically, when the machine learning system is a distributed learning system, the first node may be referred to as a central node, and the plurality of second nodes may be referred to as a plurality of distributed nodes.

The first node is a network device, a server, a terminal device, or the like. The plurality of second nodes may be a plurality of terminal devices.

Optionally, this embodiment further includes step 301*a* and step 301*b*. Step 301*a* and step 301*b* may be performed before step 301.

Step 301*a*: The first node receives, from the plurality of second nodes, computing capability information separately corresponding to the plurality of second nodes.

Optionally, the computing capability information separately corresponding to the plurality of second nodes includes floating-point operations per second (FLOPS) separately corresponding to the plurality of second nodes.

Specifically, the first node receives computing capability information of a second node 1 that is sent by the second node 1. The first node receives computing capability information of a second node 2 that is sent by the second node 2. The first node receives computing capability information of a second node 3 that is sent by the second node 3. By analogy, the first node receives computing capability information of a second node N that is sent by the second node N. In this way, the first node may obtain computing capability information separately corresponding to N second nodes.

Step 301*b*: The first node determines channel condition information separately corresponding to the first node and the plurality of second nodes.

Optionally, the channel condition information includes at least one of the following: signal-to-noise ratios, channel coefficients, channel impulse responses, and channel frequency domain responses between the first node and the plurality of second nodes.

Specifically, the plurality of second nodes separately send reference signals to the first node. The first node performs channel estimation based on the reference signals of the plurality of second nodes that are received by the first node, to obtain the channel condition information.

For example, the second node 1 sends a reference signal 1 to the first node, and the first node performs channel estimation based on the reference signal 1 to obtain channel condition information between the second node 1 and the first node. The second node 2 sends a reference signal 2 to the first node, and the first node performs channel estimation based on the reference signal 2 to obtain channel condition information between the second node 2 and the first node. By analogy, the second node N sends a reference signal N to the first node, and the first node performs channel estimation based on the reference signal N to obtain channel condition information between the second node N and the first node. In this way, the first node may obtain the channel condition information separately corresponding to the first node and the plurality of second nodes.

Based on step 301*a* and step 301*b*, step 301 specifically includes: The first node determines, based on the computing capability information separately corresponding to the plurality of second nodes, the local processing time separately corresponding to the plurality of second nodes, and/or determines, based on the channel condition information separately corresponding to the plurality of second nodes, the uploading time of the local processing results separately corresponding to the plurality of second nodes.

For example, the federated learning system includes N second nodes, and channel condition information separately corresponding to the N second nodes includes signal-to-noise ratios SNRs separately corresponding to the N second nodes. Local processing time of an $s^{th}$ second node is equal to $O_{model}/B*\log_2(1+SNR_s)$, where "/" indicates division.

$O_{model}$ is a quantity of parameters of a local model of the $s^{th}$ second node, and B is bandwidth. $SNR_s$ is a signal-to-noise ratio of the $s^{th}$ second node. $\log_2(1+SNR_s)$ is a logarithm of $1+SNR_s$ with 2 as a base. s is an integer less than or equal to N, and N is an integer greater than 1.

In this embodiment, before the first node schedules a second node, the first node delivers a local processing parameter to the second node. The local processing parameter is used by the second node to perform local processing. For example, in a federated learning system, the local processing parameter include a global model. In a distributed learning system, the local processing parameter includes a data subset. A process in which the first node delivers local processing parameters to the plurality of second nodes may be performed concurrently with a process in which the plurality of second nodes perform local processing. Therefore, in this embodiment, the first node may consider only the local processing time separately corresponding to the plurality of second nodes and the uploading time of the local processing results separately corresponding to the plurality of second nodes.

302: The first node soils sequence numbers of the plurality of second nodes based on the local processing time and the uploading time, to obtain a first sequence.

In this embodiment, step 301 to step 305 may be understood as a round executed by the machine learning system. When channel conditions and computing capabilities of the second nodes are given, to prevent the first node from scheduling same second nodes and scheduling the second nodes in a same order in an execution process of each round, this embodiment provides the following possible implementations.

Implementation 1: Step 302 specifically includes step 302*a* and step 302*b*.

Step 302*a*: The first node randomly selects M second nodes from N second nodes. M is an integer greater than 1 and less than or equal to N, and N is an integer greater than 1.

Step 302*b*: The first node sorts sequence numbers of the M second nodes based on local processing time and uploading time separately corresponding to the M second nodes, to obtain the first sequence.

In the implementation 1, the first node randomly selects the M second nodes from the N second nodes. Then, the first node determines the first sequence based on the local processing time and the uploading time of the M second nodes. In this way, the first node determines a second sequence based on the first sequence, and then schedules a second node corresponding to a sequence number included in the second sequence. The technical solution of the implementation 1 can avoid a problem that when the channel conditions and the computing capabilities of the second nodes are given, the first node schedules same second nodes and schedules the second nodes in a same order each time. This further improves accuracy of a global processing result obtained by the first node by performing global processing based on local processing results fed back by the scheduled second nodes.

Implementation 2: Step 302 specifically includes step 302*c* to step 302*e*.

Step 302*c*: The first node sorts the sequence numbers of the plurality of second nodes based on the local processing time and the uploading time of the plurality of second nodes, to obtain a third sequence.

Step 302*d*: The first node randomly selects M sequence numbers from N sequence numbers included in the third sequence. M is an integer greater than 1 and less than or equal to N, and N is an integer greater than 1.

Step 302*e*: The first node sequentially sorts the M sequence numbers based on an order of the M sequence numbers in the third sequence, to obtain the first sequence.

In the implementation 2, the first node first sorts the plurality of second nodes, to obtain the third sequence. Then, the first node randomly selects the M sequence numbers from the third sequence, and then sorts the M sequence numbers. In this way, the first node determines a second sequence based on the first sequence, and then schedules a second node corresponding to a sequence number included in the second sequence. The technical solution of the implementation 2 can avoid a problem that when the channel conditions and the computing capabilities of the second nodes are given, the first node schedules same second nodes and schedules the second nodes in a same order each time. This further improves accuracy of a global processing result obtained by the first node by performing global processing based on local processing results fed back by the scheduled second nodes. In addition, in step 302*c* in the implementation 2, the first node sorts the sequence numbers of the plurality of second nodes in each round. When second nodes in a current round executed by the machine learning system are the same as second nodes in a previous round executed by the machine learning system, a third sequence obtained in the previous round may be directly used, to avoid computation overheads caused by reordering.

303: The first node determines the second sequence based on the first sequence.

The second sequence includes some or all second node sequence numbers in the first sequence.

304: The first node schedules second nodes corresponding to the sequence numbers included in the second sequence.

In this embodiment, step 302 to step 304 are described for three possible application scenarios.

1. In a serial scheduling system, when time required by the machine learning system to execute a round is set to preset maximum processing time $T_{lim}$, and weights of the plurality of second nodes included in the serial scheduling system are the same, for a specific process of step 302 to step 304, refer to related descriptions in an embodiment shown in FIG. 4A below. $T_{lim}$ is greater than 0. The time required by the machine learning system to execute a round refers to time required by the first node to collect local processing fed back by the second nodes and perform global processing to obtain a global processing result once.

2. In a serial scheduling system, when time required by the machine learning system to execute a round is set to be greater than 0 and less than or equal to preset maximum processing time Tim, and weights of the plurality of second nodes included in the serial scheduling system are different, for a specific process of step 302 to step 304, refer to related descriptions in an embodiment shown in FIG. 5A below. $T_{lim}$ is greater than 0. The time required by the machine learning system to execute a round refers to time required by the first node to collect local processing fed back by the second nodes and perform global processing to obtain a global processing result once.

3. In a parallel scheduling system, when accuracy of the global processing result obtained by the first node by performing global processing based on the local processing results fed back by the second nodes is greater than or equal to preset accuracy, and time required by the machine learning system to execute a round is set to be greater than 0 and less than or equal to preset maximum processing time $T_{lim}$, for a specific process of step 302 to step 304, refer to related descriptions in an embodiment shown in FIG. 6A below. $T_{lim}$ is greater than 0. The time required by the machine learning system to execute a round refers to time required by the first node to collect local processing fed back by the second nodes and perform global processing to obtain a global processing result once.

After step 301 to step 304, the first node performs global processing with reference to the local processing results fed back by the second nodes corresponding to the sequence numbers included in the second sequence in step 304, to obtain the global processing result. Optionally, this embodiment further includes step 305. Step 305 is performed after step 304.

305: The first node performs global processing based on the local processing results reported by the second nodes corresponding to the sequence numbers included in the second sequence, to obtain the global processing result.

In step 304, the first node schedules the second nodes corresponding to the sequence numbers included in the second sequence, to obtain the local processing results of the second nodes corresponding to the sequence numbers included in the second sequence. Then, the first node performs global processing based on the local processing results of the second nodes corresponding to the sequence numbers included in the second sequence, to obtain the global processing result.

For example, in the federated learning system, the first node obtains local training results of the second nodes corresponding to the sequence numbers included in the second sequence. For example, the local training result includes a local model. Then, the first node performs global processing based on the local training results of the second nodes corresponding to the sequence numbers included in the second sequence, to obtain a global training result. For example, the global training result includes a global model.

For example, in the distributed learning system, the first node obtains local inference results of the second nodes corresponding to the sequence numbers included in the second sequence. Then, the first node performs global processing based on the local inference results of the second nodes corresponding to the sequence numbers included in the second sequence, to obtain a global inference result.

Step 301 to step 305 may be understood as a round executed by the machine learning system. The machine learning system may execute a plurality of rounds, and operations of each round are similar to those of step 301 to step 305. When accuracy of the global processing result obtained by the first node reaches preset accuracy, the machine learning system may no longer perform a next round. Alternatively, when time required by the machine learning system to perform a plurality of rounds reaches a preset maximum time upper limit, the machine learning system may no longer perform a next round. For example, in the federated learning system, that accuracy of the global processing result obtained by the first node reaches preset accuracy includes: Convergence precision of the global model obtained by the first node reaches preset convergence precision. Alternatively, a loss function value of the global model obtained by the first node is less than or equal to a preset value.

The node scheduling method provided in this embodiment of this application is applied to the machine learning system. The machine learning system includes the first node and the plurality of second nodes. The communication connections are established between the first node and the plurality of second nodes. The first node obtains the local processing time separately corresponding to the plurality of second nodes and/or the uploading time separately corresponding to the plurality of second nodes. Then, the first node soils the sequence numbers of the plurality of second nodes based on the local processing time separately corresponding to the plurality of second nodes and the uploading time separately corresponding to the plurality of second nodes, to obtain the first sequence. The first node determines the second sequence based on the first sequence. The second sequence includes some or all second node sequence numbers in the first sequence. The first node schedules the second nodes corresponding to the sequence numbers included in the second sequence. It can be learned that the first node selects and schedules some second nodes based on the local processing time of the plurality of second nodes and the uploading time of the plurality of second nodes, to optimize a scheduling manner of selecting and scheduling the second nodes by the first node. Further, the first node may perform global processing with reference to the local processing results fed back by the second nodes. In this way, efficiency of performing global processing by the first node can be improved, or accuracy of the global processing result obtained by the first node can be improved.

Figure 4A:
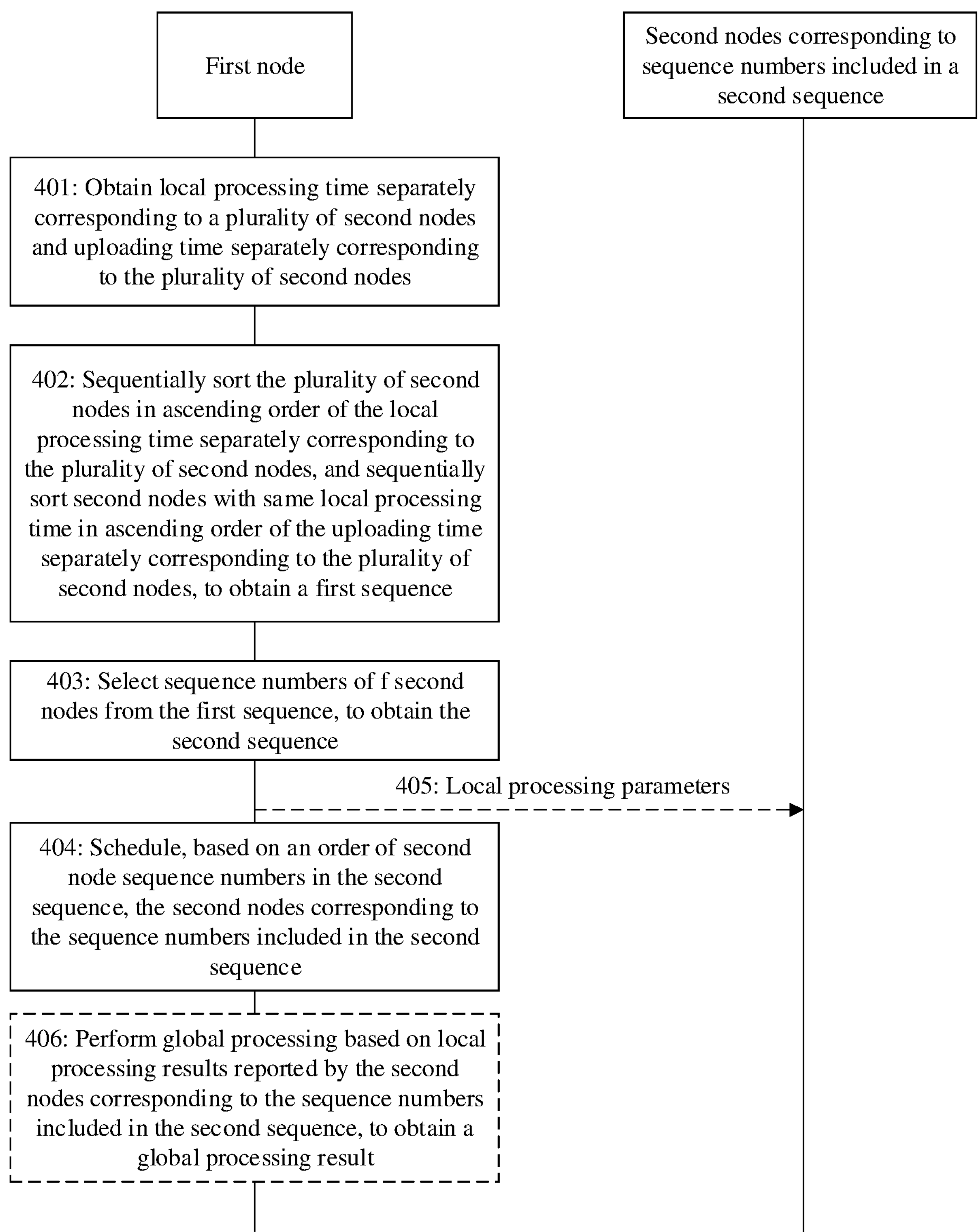
FIG. 4A is another schematic interaction diagram of a node scheduling method according to an embodiment of this application.

FIG. 4A is another schematic interaction diagram of a node scheduling method according to an embodiment of this application. The embodiment shown in FIG. 4A is applied to a serial scheduling system. In the serial scheduling system, time required by a machine learning system to execute a round is set to preset maximum processing time $T_{lim}$. A weight of each second node in the serial scheduling system is the same. In FIG. 4A, the node scheduling method includes the following steps.

401: A first node obtains local processing time separately corresponding to a plurality of second nodes and uploading time separately corresponding to the plurality of second nodes.

Step 401 is similar to step 301 in the embodiment shown in FIG. 3. For details, refer to related descriptions of step 301 in the embodiment shown in FIG. 3. Details are not described herein again.

402: The first node sequentially sorts the plurality of second nodes in ascending order of the local processing time separately corresponding to the plurality of second nodes, and sequentially sorts second nodes with same local processing time in ascending order of the uploading time separately corresponding to the plurality of second nodes, to obtain a first sequence.

For example, the plurality of second nodes include a second node 1, a second node 2, a second node 3, and a second node 4. Local processing time of the second node 1 is 3 s (seconds), and uploading time of the second node 1 is 1 s. Local processing time of the second node 2 is 4 s, and uploading time of the second node 2 is 2 s. Local processing time of the second node 3 is 5 s, and uploading time of the second node 3 is 4 s. Local processing time of the second node 4 is 5 s, and uploading time of the second node 4 is 5 s. Sequence numbers separately corresponding to the second node 1 to the second node 4 are 1, 2, 3, and 4. The first node determines, based on a sorting rule shown in step 402, that the first sequence is [1, 2, 3, 4].

It should be noted that, the first node may alternatively sequentially sort the plurality of second nodes in descending order of the local processing time separately corresponding to the plurality of second nodes, and sequentially sort second nodes with same local processing time in ascending order of the uploading time separately corresponding to the plurality of second nodes, to obtain a first sequence. This is not specifically limited in this application.

In this embodiment, if the local processing time separately corresponding to the plurality of second nodes is the same, the first node may sequentially sort the plurality of second nodes based on the uploading time separately corresponding to the plurality of second nodes, to obtain the first sequence. If the uploading time separately corresponding to the plurality of second nodes is the same, the first node may sequentially sort the plurality of second nodes based on the local processing time separately corresponding to the plurality of second nodes, to obtain the first sequence.

403: The first node selects sequence numbers off second nodes from the first sequence, to obtain a second sequence.

f is a maximum value that meets a first condition. The first condition includes: A sum of first time and largest local processing time in local processing time of the f second nodes is less than or equal to the preset maximum processing time.

The first time is equal to a sum of uploading time separately corresponding to the f second nodes minus overlapping time between the largest local processing time and the uploading time of the f second nodes. f is an integer greater than 1.

An order of the sequence numbers corresponding to the f second nodes in the first sequence is the same as an order of the sequence numbers corresponding to the f second nodes in the second sequence.

Specifically, the first node selects the f second nodes from the first sequence based on the sequence numbers included in the first sequence. In other words, an order of the f second nodes in the first sequence is a front-to-back order. f is the maximum value that meets the first condition. Then, the first node sequentially sorts the f second nodes based on the order of the f second nodes in the first sequence, to obtain the second sequence.

Figure 4B:
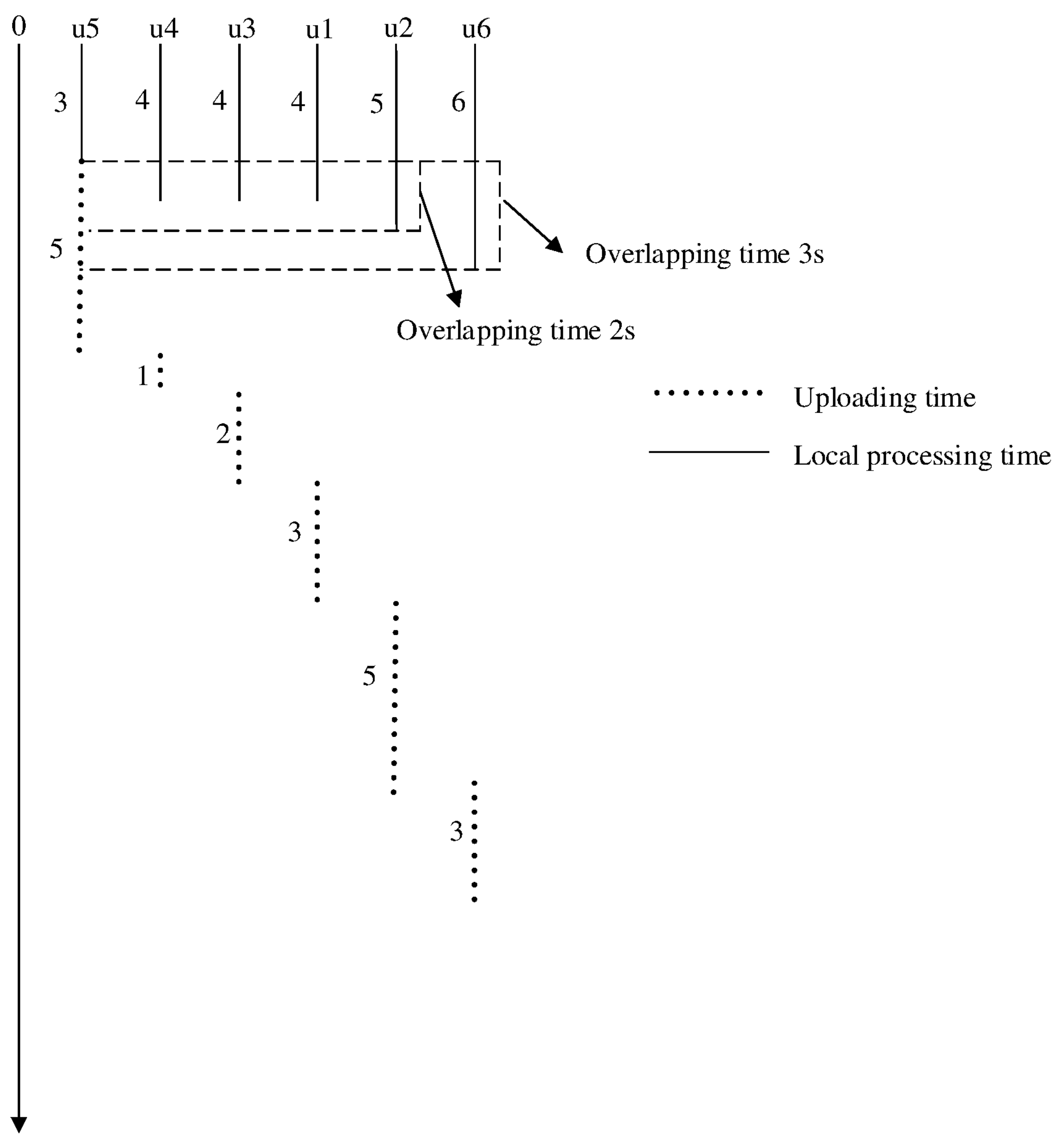
FIG. 4B is a schematic diagram of a scenario of a node scheduling method according to an embodiment of this application.

For example, as shown in FIG. 4B, sequence numbers included in the first sequence are sequentially u5, u4, u3, u1, u2, and u6. The preset maximum processing time is 19 s. It can be learned from FIG. 4B that that the first node selects the first sequence number, the first two sequence numbers, the first three sequence numbers, the first four sequence numbers, or the first five sequence numbers of the first sequence meets the first condition. Therefore, the first node selects the first five sequence numbers of the first sequence. The first five sequence numbers are u5, u4, u3, u1, and u2. It can be learned that a sum of uploading time of second nodes corresponding to u5, u4, u3, u1, and u2 is 16 s. Largest local processing time in local processing time of the second nodes corresponding to u5, u4, u3, u1, and u2 is local processing time of u5, that is, 5 s.

Overlapping time between the uploading time of the second nodes corresponding to u5, u4, u3, u1, and u2 and the largest local processing time in the local processing time of the second nodes corresponding to u5, u4, u3, u1, and u2 is 2 s. Therefore, the first time is time obtained by subtracting the overlapping time between the largest local processing time and the uploading time of the second nodes corresponding to u5, u4, u3, u1, and u2 from the sum of the uploading time of the second nodes corresponding to u5, u4, u3, u1, and u2, that is, 14 s. A sum of the first time and the largest local processing time in the local processing time of the second nodes corresponding to u5, u4, u3, u1, and u2 is 19 s. The first node selects the first five sequence numbers of the first sequence, and sequentially sorts the first five sequence numbers based on an order of the first five sequence numbers in the first sequence, to obtain the second sequence. That is, the second sequence is [u5, u4, u3, u1, u2].

For another example, as shown in FIG. 4B, sequence numbers included in the first sequence are sequentially u5, u4, u3, u1, u2, and u6. The preset maximum processing time is 17 s. It can be learned from FIG. 4B that that the first node selects the first sequence number, the first two sequence numbers, the first three sequence numbers, the first four sequence numbers, or the first four sequence numbers and the $6^{th}$ sequence number of the first sequence meets the first condition. If the first node selects the first five sequence numbers, second nodes corresponding to the first five sequence numbers do not meet a third condition. Therefore, the first node selects the first four sequence numbers and the $6^{th}$ sequence number of the first sequence. The first four sequence numbers and the $6^{th}$ sequence number are separately u5, u5, u4, u3, u1, and u6. Largest local processing time in local processing time of second nodes corresponding to u5, u4, u3, u1, and u6 is 6 s. A sum of uploading time of the second nodes corresponding to u5, u4, u3, u1, and u6 is 14 s. Overlapping time between the uploading time of the second nodes corresponding to u5, u4, u3, u1, and u6 and the largest local processing time in the local processing time of the second nodes corresponding to u5, u4, u3, u1, and u6 is 3 s. Therefore, the first time is time obtained by subtracting the overlapping time between the largest processing time and the uploading time of the second nodes separately corresponding to u5, u4, u3, u1, and u6 from the sum of the uploading time of the second nodes separately corresponding to u5, u4, u3, u1, and u6, that is, 11 s. A sum of the first time and the largest local processing time in the local processing time of the second nodes corresponding to u5, u4, u3, u1, and u6 is 17 s. The first node sequentially sorts the first four sequence numbers and the $6^{th}$ sequence number based on an order of the first four sequence numbers and the $6^{th}$ sequence number in the first sequence, to obtain the second sequence. That is, the second sequence is [u5, u4, u3, u1, u6].

It should be noted that, if the first node sequentially sorts the plurality of second nodes in descending order of the local processing time separately corresponding to the plurality of second nodes, and sequentially sorts the second nodes with same local processing time in ascending order of the uploading time separately corresponding to the plurality of second nodes, to obtain the first sequence, in step 403, the first node selects f second nodes from the first sequence in a back-to-front order of the sequence numbers included in the first sequence. In other words, an order of the f second nodes in the first sequence is a back-to-front order. The f second nodes are maximum values that meet the first condition. Then, the first node sorts the f second nodes in a back-to-front order of the f second nodes in the first sequence, to obtain a second sequence.

404: The first node schedules, based on an order of the second node sequence numbers in the second sequence, the second nodes corresponding to the sequence numbers included in the second sequence.

For example, the second sequence is [u5, u4, u3, u1, u6]. The first node schedules, based on an order of second node sequence numbers in the second sequence, second nodes corresponding to u5, u4, u3, u1, and u6.

The second sequence includes a sequence number $a_i$ of the second node, $i \in [1, X]$, and X is a quantity of second node sequence numbers in the second sequence. i is an integer, and X is an integer greater than 1. A sequence number of an $a_i^{th}$ second node is before a sequence number of an $a_{i+1}^{th}$ second node.

Figure 4C:
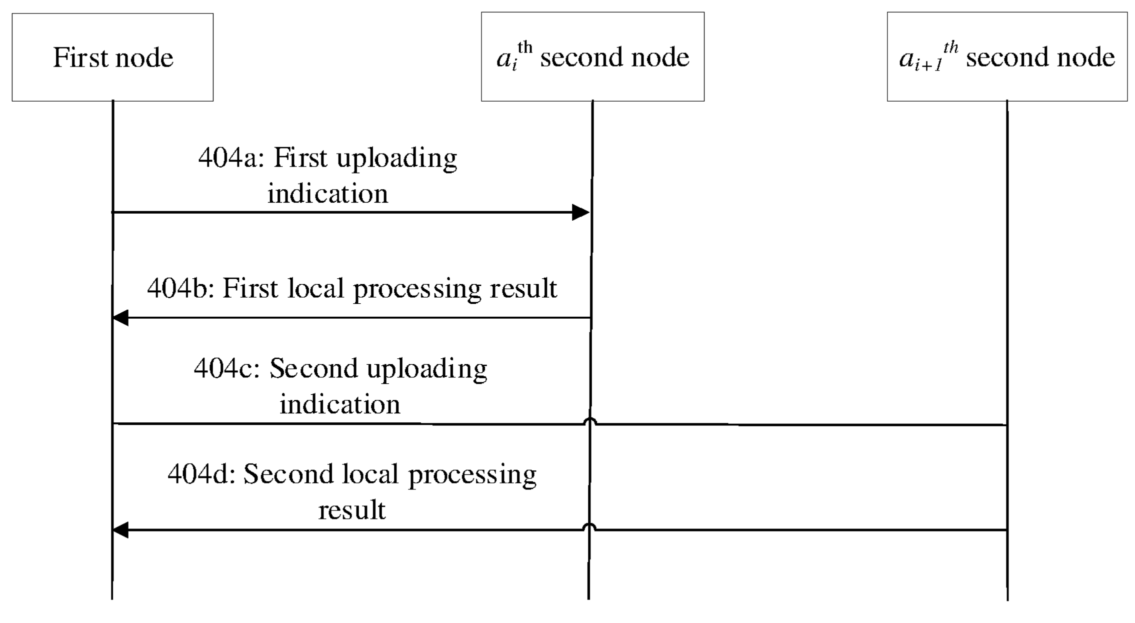
FIG. 4C is a schematic diagram of scheduling second nodes corresponding to sequence numbers included in a second sequence by a first node in a serial scheduling system according to an embodiment of this application.

With reference to FIG. 4C, the following describes step 404 by using an example in which the first node schedules the $a_i^{th}$ second node and the $a_{i+1}^{th}$ second node.

With reference to FIG. 4C, step 404 specifically includes step 404*a* to step 404*d*.

Step 404*a*: The first node sends a first uploading indication to the $a_i^{th}$ second node, and correspondingly, the $a_i^{th}$ second node receives the first uploading indication.

The first uploading indication indicates the $a_i^{th}$ second node to upload a first local processing result.

Specifically, the $a_i^{th}$ second node performs local processing based on a local processing parameter delivered by the first node, to obtain the first local processing result. For related descriptions of the local processing parameter, refer to related descriptions of step 405 below.

Optionally, the first local processing result includes a first local training result or a first local inference result.

Specifically, in a federated learning system, the $a_i^{th}$ second node performs training based on a global model delivered by the first node and local data, to obtain the first local training result. In a distributed learning system, the $a_i^{th}$ second node performs local inference based on a first data subset sent by the first node to the $a_i^{th}$ second node and a preset model in the $a_i^{th}$ second node, to obtain the first local inference result.

Step 404*b*: The $a_i^{th}$ second node sends the first local processing result to the first node, and correspondingly, the first node receives the first local processing result sent by the $a_i^{th}$ second node.

Specifically, in the federated learning system, the $a_i^{th}$ second node sends the first local training result to the first node. In the distributed learning system, the $a_i^{th}$ second node sends the first local inference result to the first node.

Step 404*c*: The first node sends a second uploading indication to the $a_{i+1}^{th}$ second node. Correspondingly, the $a_{i+1}^{th}$ second node receives the second uploading indication sent by the first node.

The second uploading indication indicates the $a_{i+1}^{th}$ second node to upload a second local processing result.

Step 404*d*: The $a_{i+1}^{th}$ second node sends the second local processing result to the first node. Correspondingly, the first node receives the second local processing result sent by the $a_{i+1}^{th}$ second node.

Step 404*c* and step 404*d* are similar to step 404*a* and step 404*b*. For details, refer to related descriptions of step 404*a* and step 404*b*. Details are not described herein again.

In the serial scheduling system, when the time required by the machine learning system to execute a round is set to the preset maximum processing time, and the weight of each second node is the same, the first node may select, according to the technical solution of step 402 to step 404, a maximum of second nodes to feed back corresponding local processing results to the first node. When the weight of each second node is the same, in a process in which the machine learning system performs each round, if more second nodes participate in local processing and feed back corresponding local processing results, accuracy of a global processing result obtained by the first node is higher.

Optionally, a factor for setting the weight of each second node includes any one of the following:

1. Data Volume of Local Data of Each Second Node

Specifically, if the data volume of the local data of each second node is the same, the weight of each second node is the same. If the data volume of the local data of each second node is different, the weight of each second node is different. For example, a weight of a second node whose local data has a large data volume is large, and a weight of a second node that processes a small amount of local data is small.

2. Importance of Local Data of Each Second Node

Specifically, if the importance of the local data of each second node is the same, the weight of each second node is the same. If the importance of the local data of each second node is different, the weight of each second node is different. For example, a weight of a second node whose local data has high importance is large, and a weight of a second node whose local data has low importance is small.

3. Local Processing Precision Requirement of Each Second Node

For example, in the distributed learning system, if the local processing precision requirement of each second node is the same, the weight of each second node is the same. If the local processing precision requirement of each second node is different, the weight of each second node is different. For example, a weight of a second node with a high local processing precision requirement is large, and a weight of a second node with a low local processing precision requirement is small.

Optionally, the embodiment shown in FIG. 4A further includes step 405. Step 405 is performed before step 404.

405: The first node sends corresponding local processing parameters to the second nodes corresponding to the sequence numbers included in the second sequence. Correspondingly, the second nodes corresponding to the sequence numbers included in the second sequence separately receive the corresponding local processing parameters sent by the first node.

Optionally, the local processing parameter includes a global model or a data subset.

Specifically, the first node delivers the corresponding local processing parameters to the second nodes corresponding to the sequence numbers included in the second sequence, so that the second nodes corresponding to the sequence numbers included in the second sequence perform local processing. Therefore, in step 404, when the first node schedules the second nodes corresponding to the sequence numbers included in the second sequence, the second nodes corresponding to the sequence numbers included in the second sequence may feed back, to the first node, local processing results corresponding to the second nodes corresponding to the sequence numbers included in the second sequence.

In a possible implementation, that the first node sends corresponding local processing parameters to the second nodes corresponding to the sequence numbers included in the second sequence includes: The first node sends global models to the second nodes corresponding to the sequence numbers included in the second sequence.

Specifically, in the federated learning system, the first node delivers the global models to the second nodes corresponding to the sequence numbers included in the second sequence, so that the second nodes corresponding to the sequence numbers included in the second sequence perform local training.

In another possible implementation, that the first node sends corresponding local processing parameters to the second nodes corresponding to the sequence numbers included in the second sequence includes: The first node sends corresponding data subsets to the second nodes corresponding to the sequence numbers included in the second sequence.

For example, in the distributed learning system, the first node sends a first data subset to the $a_i^{th}$ second node, and sends a second data subset to the $a_{i+1}^{th}$ second node. The first data subset is used by the $a_i^{th}$ second node to perform local inference. The second data subset is used by the $a_{i+1}^{th}$ second node to perform local inference.

It should be noted that there is no fixed execution sequence between step 405 and step 401 to step 403. Step 401 to step 403 may be performed before step 405, or step 405 may be performed before step 401 to step 403, or step 401 to step 403 and step 405 may be simultaneously performed based on a situation. This is not specifically limited in this application.

Optionally, this embodiment further includes step 406. Step 406 is performed after step 404.

406: The first node performs global processing based on the local processing results reported by the second nodes corresponding to the sequence numbers included in the second sequence, to obtain a global processing result.

Step 406 is similar to step 305 in the embodiment shown in FIG. 3. For details, refer to related descriptions of step 305 in the embodiment shown in FIG. 3. Details are not described herein again.

Step 401 to step 406 may be understood as a round executed by the machine learning system. The machine learning system may execute a plurality of rounds, and operations of each round are similar to those of step 401 to step 406.

It should be noted that, when the first sequence and the second sequence remain unchanged (local processing time and uploading time of each second node remain unchanged or change slightly), the first node may reuse the first sequence obtained in step 402 and the second sequence obtained in step 403. In other words, starting from the second round executed by the machine learning system, operations of each round are the same as those of step 404 to step 406. In other words, step 401 to step 403 do not need to be performed in each round.

Figure 4D:
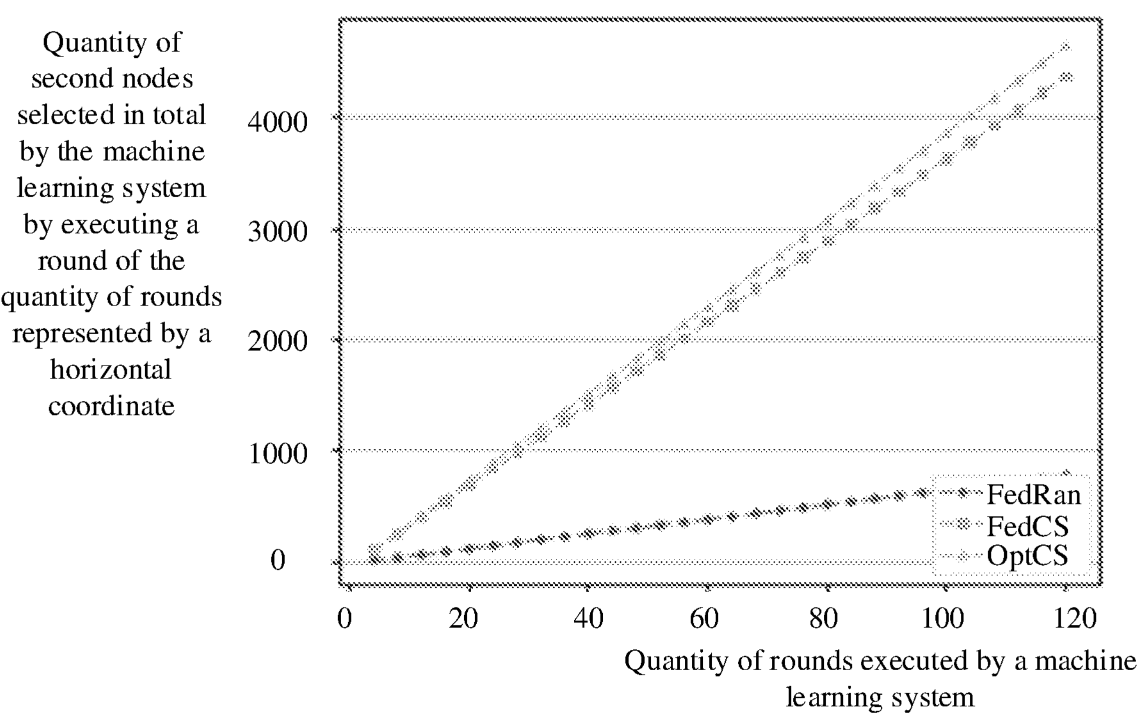
FIG. 4D is a schematic effect diagram of a node scheduling method according to an embodiment of this application.

In a time division multiple access (TDMA) communication system, a machine learning system executes a plurality of rounds according to the technical solution in the embodiment shown in FIG. 4A. FIG. 4D shows quantities of second nodes selected in the plurality of rounds executed by the machine learning system according to the technical solution in the embodiment shown in FIG. 4A in the TDMA communication system. The TDMA communication system includes 1000 second nodes. Local processing time of the 1000 second nodes is random numbers evenly distributed in an interval of [5 s, 150 s]. Uploading time of the 1000 second nodes is random numbers evenly distributed in an interval of [1 s, 120 s]. Each experiment is conducted for 120 rounds, and maximum processing time allowed for each round is 180 s. A first node randomly selects 100 second nodes in each round as candidate second nodes. The first node selects a second node from the 100 second nodes according to the technical solution in the embodiment shown in FIG. 4A, and schedules the selected second node. The first node repeats the experiment for 10 times. The first node averages experiment results of the 10 times of experiments, to obtain an average value of experiment results of each experiment, that is, an average value of quantities of second nodes selected in the 120 rounds.

In FIG. 4D, a horizontal coordinate is a quantity of rounds executed by the machine learning system, and a vertical coordinate is a quantity of second nodes selected in total by the machine learning system by executing a round of the quantity of rounds represented by the horizontal coordinate. For example, in a dashed line shown by OptCS in FIG. 4D, a value of a vertical coordinate corresponding to a horizontal coordinate 20 is a quantity of second nodes selected in total in the first 20 rounds of the 120 rounds executed by the machine learning system. A value of a vertical coordinate corresponding to a horizontal coordinate 40 is a quantity of second nodes selected in total in the first 40 rounds of the 120 rounds executed by the machine learning system. In FIG. 4D, the dashed line shown by OptCS is a schematic diagram of an effect obtained by the machine learning system according to the technical solution in the embodiment shown in FIG. 4A. A dashed line shown by FEDRan is a schematic diagram of an effect obtained by the machine learning system by using a random selection algorithm. A dashed line shown by FedCS is a schematic diagram of an effect obtained by the machine learning system by using a greedy algorithm.

It can be learned from FIG. 4D that when a same quantity of rounds are executed by the machine learning system, a quantity of selected second nodes corresponding to the dashed line shown by OptCS is the largest. In the TDMA communication system, when time required for each round is set to preset maximum processing time, and a weight of each second node is the same, if more second nodes participate in local processing and feed back local processing results in a process of each round, accuracy of a global processing result obtained by the first node is higher.

In this embodiment of this application, in the serial scheduling system, when the time required for each round is set to the preset maximum processing time, and the weight of each second node is the same, the first node may select, according to the technical solution shown in FIG. 4A, a maximum of second nodes in each round to feed back corresponding local processing results to the first node. In the serial scheduling system, when the time required for each round is set to the preset maximum processing time, and the weight of each second node is the same, if more second nodes participate in local processing and feed back corresponding local processing results in the process of each round, the accuracy of the global processing result obtained by the first node is higher.

FIG. 5A is another schematic interaction diagram of a node scheduling method according to an embodiment of this application. The embodiment shown in FIG. 5A is applied to a serial scheduling system. Time required by a machine learning system to execute a round is set to be greater than 0 and less than or equal to preset maximum processing time $T_{lim}$. A weight of each second node in the serial scheduling system is different. For related descriptions of the weight of the second node, refer to related descriptions of step 404 in the embodiment shown in FIG. 4A. Details are not described herein again. In FIG. 5A, the node scheduling method includes the following steps.

501: A first node obtains local processing time separately corresponding to a plurality of second nodes and uploading time separately corresponding to the plurality of second nodes.

502: The first node sequentially sorts the plurality of second nodes in ascending order of the local processing time separately corresponding to the plurality of second nodes, and sequentially sorts second nodes with same local processing time in ascending order of the uploading time separately corresponding to the plurality of second nodes, to obtain a first sequence.

Step 501 and step 502 are similar to step 401 and step 402 in the embodiment shown in FIG. 4A. For details, refer to related descriptions of step 401 and step 402 in the embodiment shown in FIG. 4A. Details are not described herein again.

503: The first node determines, according to a recursive algorithm, sequence numbers of e second nodes and an order of the e second nodes based on the first sequence, weights of the plurality of second nodes, the local processing time separately corresponding to the plurality of second nodes, and the uploading time separately corresponding to the plurality of second nodes.

The e second nodes meet a second condition, and e is an integer greater than or equal to 1.

The second condition includes that an obtained sum of weights of the e second nodes is maximum when time required by the first node to collect local processing results fed back by the e second nodes is less than or equal to the preset maximum processing time.

The order of the e second nodes is an order of the sequence numbers of the e second nodes in the first sequence.

The following shows specific pseudocode for the first node to determine the sequence numbers of the e second nodes and the order of the e second nodes according to the recursive algorithm.

Initialize $f_{0,0}$ to 0 and $f_{c,t}$ to negative infinity;

```
for c=1 to N
  for t=0 to T_lim
    f_{c,t}=max(f_{c,t}, f_{c-1,t})
      if max(t, T_update [P_c])+T_upload [P_c]≤T_lim
  f_{j,max(t,T_update[P_c])+T_upload[P_c]} = max (f_{t,max(t,T_update[P_c])+T_upload[P_c]}, f_{j-1,t} + w_{P_c})
```

$c \in [1, N]$, N is a quantity of second nodes corresponding to sequence numbers included in the first sequence, and c is an integer. $t \in [0, T_{lim}]$, and $T_{lim}$ is the preset maximum processing time. t is a time value determined from $[0, T_{lim}]$ based on discrete unit time, and $T_{lim}$ is greater than 0. For example, t1 is the discrete unit time, and t2 is two times of discrete unit time.

$T_{update}[P_c]$ is local processing time of a $c^{th}$ second node in the first sequence. $T_{upload}[P_c]$ is uploading time of the $c^{th}$ second node in the first sequence.

$w_{P_c}$ is a weight of the $c^{th}$ second node in the first sequence. max(a1, a2) indicates to take a larger value from a1 and a2.

The first node may obtain the following Table 1 based on the code of the recursive algorithm. In Table 1, $t \in [0, T_{lim}]$, t is an integer, and the discrete unit time is 1 s. Y is a largest integer in $[0, T_{lim}]$. When $T_{lim}$ is an integer, Y is equal to $T_{lim}$.

TABLE 1

| c, t (s) | 0 | 1 | 2 | 3 | . . . | Y |
|---|---|---|---|---|---|---|
| 1 | $f_{1,0}$ | $f_{1,1}$ | $f_{1,2}$ | $f_{1,3}$ | | $f_{1,Y}$ |
| 2 | $f_{2,0}$ | $f_{2,1}$ | $f_{2,2}$ | $f_{2,3}$ | | $f_{2,Y}$ |
| 3 | $f_{3,0}$ | $f_{3,1}$ | $f_{3,2}$ | $f_{3,3}$ | | $f_{3,Y}$ |
| . . . | | | | | | |
| N | $f_{N,0}$ | $f_{N,1}$ | $f_{N,2}$ | $f_{N,3}$ | | $f_{N,Y}$ |

The first node selects $f_{e,T}$ with a largest value in Table 1. The time required by the first node to collect the local processing results fed back by the e second nodes is time T. It can be learned from the pseudocode of the recursive algorithm that the obtained sum of weights of the e second nodes is maximum when the time required by the first node to collect the local processing results fed back by the e second nodes is less than or equal to the preset maximum processing time $T_{lim}$. Therefore, the first node may determine the sequence numbers of the e second nodes and an order of the e second nodes in the first sequence, and uses the order of the e second nodes in the first sequence as the order of the e second nodes.

504: The first node determines a second sequence based on the sequence numbers of the e second nodes and the order of the e second nodes.

Specifically, the first node sorts the sequence numbers of the e second nodes based on the order of the e second nodes, to obtain the second sequence.

505: The first node schedules, based on an order of the second node sequence numbers in the second sequence, the second nodes corresponding to the sequence numbers included in the second sequence.

Step 505 is similar to step 404 in the embodiment shown in FIG. 4A. For details, refer to related descriptions in the embodiment shown in FIG. 4A.

Optionally, this embodiment further includes step 506. Step 506 is performed before step 505.

506: The first node sends corresponding local processing parameters to the second nodes corresponding to the sequence numbers included in the second sequence.

Correspondingly, the second nodes corresponding to the sequence numbers included in the second sequence receive the corresponding local processing parameters sent by the first node.

Step 506 is similar to step 405 in the embodiment shown in FIG. 4A. For details, refer to related descriptions of step 405 in the embodiment shown in FIG. 4A. Details are not described herein again.

It should be noted that there is no fixed execution sequence between step 506 and step 501 to step 504. Step 501 to step 504 may be performed before step 506, or step 506 may be performed before step 501 to step 504, or step 501 to step 504 and step 506 may be simultaneously performed based on a situation. This is not specifically limited in this application.

Optionally, this embodiment further includes step 507. Step 507 is performed after step 505.

507: The first node performs global processing based on the local processing results reported by the second nodes corresponding to the sequence numbers included in the second sequence, to obtain a global processing result.

Step 507 is similar to step 406 in the embodiment shown in FIG. 4A. For details, refer to related descriptions of step 406 in the embodiment shown in FIG. 4A. Details are not described herein again.

Figure 5B:
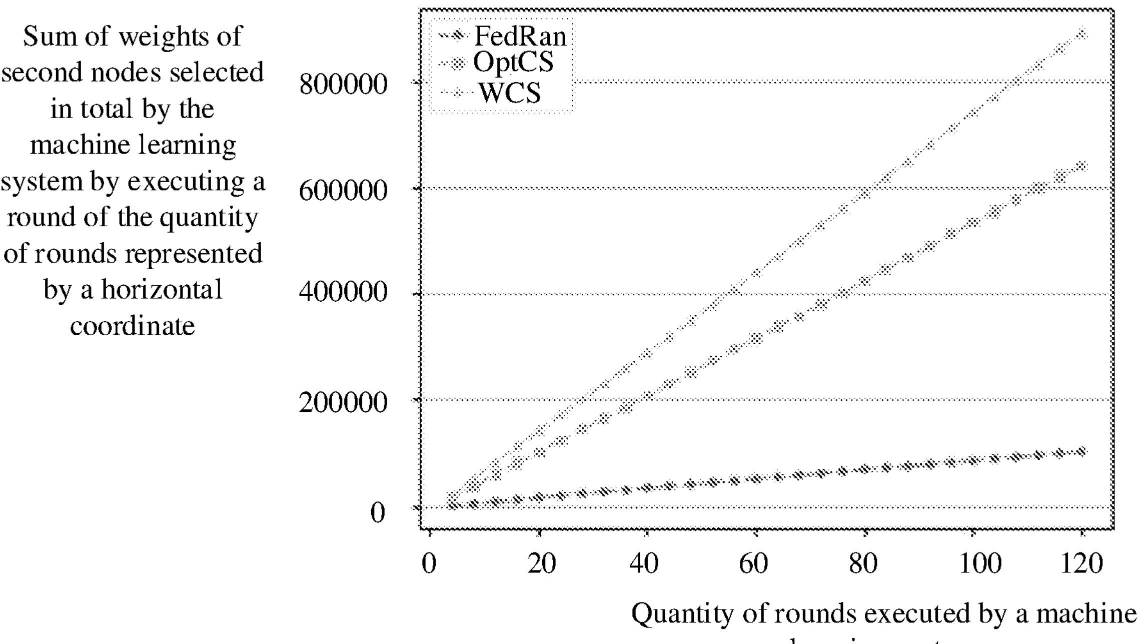
FIG. 5B is another schematic effect diagram of a node scheduling method according to an embodiment of this application.

In a TDMA communication system, a machine learning system executes a plurality of rounds according to the technical solution in the embodiment shown in FIG. 5A. FIG. 5B shows sums of weights of second nodes selected in the plurality of rounds executed by the machine learning system according to the technical solution in the embodiment shown in FIG. 5A in the TDMA communication system. The TDMA communication system includes 1000 second nodes. Local processing time of the 1000 second nodes is random numbers evenly distributed in an interval of [5 s, 150 s]. Uploading time of the 1000 second nodes is random numbers evenly distributed in an interval of [1 s, 120 s]. Each experiment is conducted for 120 rounds, and maximum processing time allowed for each round is 180 s. In a process of executing each round, a first node randomly selects 100 second nodes as candidate second nodes. Then, the first node selects, according to the technical solution in the embodiment shown in FIG. 5A, a scheduled second node from the 100 second nodes, to obtain a local processing result fed back by the scheduled second node. The first node performs local processing based on the local processing result fed back by the scheduled second node, to obtain a global processing result. The first node repeats the experiment for 10 times. The first node averages experiment results of the 10 times of experiments, to obtain an average value of experiment results of each experiment, that is, an average value of sums of weights of second nodes selected in the 120 rounds.

In FIG. 5B, a horizontal coordinate is a quantity of rounds executed by the machine learning system, and a vertical coordinate is a sum of weights of second nodes selected in total by the machine learning system by executing a round of the quantity of rounds represented by the horizontal coordinate. For example, as shown in FIG. 5B, in a dashed line shown by OptCS, a value of a vertical coordinate corresponding to a horizontal coordinate 20 is a sum of weights of second nodes selected in total in the first 20 rounds of the 120 rounds executed by the machine learning system. A value of a vertical coordinate corresponding to a horizontal coordinate 40 is a sum of weights of second nodes selected in total in the first 40 rounds of the 120 rounds executed by the machine learning system. In FIG. 4D, the dashed line shown by OptCS is a schematic diagram of an effect obtained by the first node according to the technical solution in the embodiment shown in FIG. 5A. A dashed line shown by FEDRan is a schematic diagram of an effect obtained by the first node by using a random selection algorithm. A dashed line shown by FedCS is a schematic diagram of an effect obtained by the first node by using a greedy algorithm.

It can be learned from FIG. 5B that when a same quantity of rounds are executed by the machine learning system, a sum of weights of selected second nodes corresponding to the dashed line shown by OptCS is the largest. In the TDMA communication system, when time required by the machine learning system to execute a round is less than or equal to preset maximum processing time, if a sum of weights of second nodes that participate in local processing and feed back local processing results in a process of each round is larger, accuracy of a global processing result obtained by the first node is higher.

In this embodiment of this application, in the serial scheduling system, when the time required by the machine learning system to execute a round is set to be greater than 0 and less than or equal to the preset maximum processing time, the first node may select, according to the technical solution in the embodiment shown in FIG. 5A, a plurality of second nodes with a largest sum of weights in each round to feed back corresponding local processing results to the first node. In the serial scheduling system, when the time required by the machine learning system to execute a round is set to be greater than 0 and less than or equal to the preset maximum processing time, if a sum of weights of second nodes that participate in local processing and feed back local processing results in each round is larger, accuracy of a global processing result obtained by the first node is higher.

FIG. 6A is another schematic interaction diagram of a node scheduling method according to an embodiment of this application. The embodiment shown in FIG. 6A is applied to a parallel scheduling system. In the parallel scheduling system, accuracy of a global processing result obtained by a first node after a plurality of rounds is required to be greater than or equal to preset accuracy, and time required by a machine learning system to execute a round is set to be greater than 0 and less than or equal to preset maximum processing time $T_{lim}$. In FIG. 6A, the node scheduling method includes the following steps.

601: The first node obtains local processing time separately corresponding to a plurality of second nodes and uploading time separately corresponding to the plurality of second nodes.

Step 601 is similar to step 301 in the embodiment shown in FIG. 3. For details, refer to related descriptions of step 301 in the embodiment shown in FIG. 3. Details are not described herein again.

602: The first node determines, based on the local processing time of the plurality of second nodes, the uploading time of the plurality of second nodes, and first processing time, a bandwidth pre-allocation ratio value that is of each of the plurality of second nodes and that corresponds to the first processing time.

The first processing time T is less than or equal to the preset maximum processing time $T_{lim}$, and $T_{lim}$ is greater than 0.

Specifically, the preset maximum processing time $T_{lim}$ is an upper limit of preset maximum time required by the machine learning system to execute a round. The first processing time T is assumed time required by the machine learning system to execute a round. The first processing time T may be determined from [0, $T_{lim}$] based on discrete unit time. For example, $T_{lim}$ is 1, and the discrete unit time is 1, so that there is only one piece of first processing time, in other words, the first processing time T is 1. In this embodiment, an example in which there is one piece of first processing time is used to describe the technical solution in this embodiment of this application.

For details of a case in which there are b pieces of first processing time, and b is an integer greater than 1, refer to related descriptions in the embodiment shown in FIG. 7A below. Details are not described herein again.

Optionally, a bandwidth pre-allocation ratio value $bound_p$ that is of a $p^{th}$ second node and that corresponds to the first processing time is equal to $C_p/(T-D_p)$, where $C_p$ is uploading time of the $p^{th}$ second node when all bandwidth is allocated to the $p^{th}$ second node, T is the first processing time, $D_p$ is local processing time of the $p^{th}$ second node, p is an integer greater than or equal to 1 and less than or equal to N, N is a quantity of second nodes in the parallel scheduling system, and "/" indicates division.

603: The first node determines, based on the bandwidth pre-allocation ratio value, a first sequence corresponding to the first processing time.

Specifically, the first node sequentially sorts sequence numbers of the plurality of second nodes in ascending order of bandwidth pre-allocation ratio values, to obtain the first sequence.

For example, the parallel scheduling system includes N second nodes, and bandwidth pre-allocation ratio values separately corresponding to the N second nodes are $bound_1$, $bound_2$, . . . , and $bound_N$. Sequence numbers corresponding to the N second nodes are a1, a2, a3, a4, a5, a6, a7, a8, a9, and a10. In this case, the first node sequentially sorts the sequence numbers of the N second nodes based on $bound_1$, $bound_2$, . . . , and $bound_N$, to obtain the first sequence. For example, the first sequence is [$a_1$, $a_2$, $a_5$, $a_6$, $a_4$, $a_7$, $a_3$, $a_8$, $a_{10}$, $a_9$].

It should be noted that for sequence numbers of two second nodes whose bandwidth pre-allocation ratio values are the same, an order of the two second nodes in the first sequence is not limited.

It should be noted that the first node may alternatively sequentially sort sequence numbers of the plurality of second nodes in descending order of bandwidth pre-allocation ratio values, to obtain the first sequence.

604: The first node uses the bandwidth pre-allocation ratio value that is of each second node and that corresponds to the first processing time as a bandwidth allocation ratio value that is of each second node and that corresponds to the first processing time.

In a possible implementation, a bandwidth allocation ratio value $bound_p$ that is of the $p^{th}$ second node and that corresponds to the first processing time is equal to $C_p/(T-D_p)$, and "/" indicates division.

605: The first node determines a second sequence in the first sequence based on the bandwidth allocation ratio value that is of each second node and that corresponds to the first processing time.

The second sequence includes sequence numbers of q second nodes in the first sequence.

q is a maximum value that meets a third condition. The third condition includes: a sum of bandwidth allocation ratio values that are separately of the q second nodes and that correspond to the first processing time is less than or equal to 1, and a sum of local processing time and uploading time of a second node with a largest sum of local processing time and uploading time in the q second nodes is less than or equal to the first processing time.

An order of the sequence numbers corresponding to the q second nodes in the first sequence is the same as an order of the sequence numbers corresponding to the q second nodes in the second sequence.

Specifically, the first node selects the q second nodes from the first sequence based on the sequence numbers included in the first sequence. In other words, an order of the q second nodes in the first sequence is a front-to-back order. The q second nodes are maximum values that meet the third condition. The sum of the bandwidth allocation ratio values of the second nodes corresponding to the sequence numbers included in the second sequence is less than or equal to 1.

For example, sequence numbers included in the first sequence are sequentially u5, u4, u3, u1, u2, and u6. Bandwidth allocation ratio values of second nodes corresponding to the sequence numbers included in the first sequence are separately 0.1, 0.2, 0.3, 0.4, 0.5, and 0.5. For local processing time and uploading time of the second nodes corresponding to u5, u4, u3, u1, u2, and u6, refer to FIG. 4B. The first processing time is 9 s. Therefore, it can be learned that that the first node selects the first sequence number, the first two sequence numbers, the first three sequence numbers, or the first four sequence numbers of the first sequence meets the third condition. Therefore, the first node selects the first four sequence numbers in the first sequence, to obtain the second sequence. The second sequence is [u5, u4, u3, u1].

For another example, sequence numbers included in the first sequence are sequentially u5, u4, u3, u1, u2, and u6. Bandwidth allocation ratio values of second nodes corresponding to the sequence numbers included in the first sequence are separately 0.1, 0.1, 0.2, 0.2, 0.4, and 0.4. For local processing time and uploading time of the second nodes corresponding to u5, u4, u3, u1, u2, and u6, refer to FIG. 4B. The first processing time is 9 s. Therefore, it can be learned that that the first node selects the first sequence number, the first two sequence numbers, the first three sequence numbers, the first four sequence numbers, or the first four sequence numbers and the $6^{th}$ sequence number of the first sequence meets the third condition. If the first node selects the first five sequence numbers of the first sequence, a sum of bandwidth allocation ratio values of second nodes corresponding to the first five sequence numbers is equal to 1. However, a second node that is in the second nodes corresponding to the first five sequence numbers and that has a largest sum of local processing time and uploading time is a second node corresponding to u2, and a sum of local processing data and uploading time of the second node corresponding to u2 is 10 s. In other words, the sum of the local processing data and the uploading time of the second node corresponding to u2 is greater than the first processing time. In other words, the second nodes corresponding to the first five sequence numbers of the first sequence do not meet the third condition. Therefore, the first node selects the first four sequence numbers and the $6^{th}$ sequence number in the first sequence, to obtain the second sequence. The second sequence is [u5, u4, u3, u1, u6].

It should be noted that the bandwidth allocation ratio values of the second nodes corresponding to the sequence numbers included in the first sequence are merely an example. During actual application, the bandwidth allocation ratio values of the second nodes corresponding to the sequence numbers included in the first sequence are sorted in ascending order. This is not specifically limited in this application. For example, the bandwidth allocation ratio values of the second nodes corresponding to the sequence numbers included in the first sequence may alternatively be 0.1, 0.3, 0.3, 0.4, 0.4, and 0.5.

In this embodiment, in the parallel scheduling system, when the accuracy of the global processing result obtained by the first node is required to be greater than or equal to the preset accuracy, the first node selects a second node and allocate a bandwidth proportion to the second node, to minimize the time required by the machine learning system to execute a round.

The following provides descriptions by using a federated learning system as an example. When a global model is given and the accuracy of the global processing result meets the preset accuracy, a quantity of rounds that need to be executed by the machine learning system is β

$$\left(\theta + \frac{1}{|S|}\right).$$

Both β and θ are parameters related to the global model and an accuracy requirement on the global model, S is a set of selected nodes, and |S| indicates a quantity of elements in the set of selected nodes.

Time required for each round may be represented by $$\max_{j \in S}\left\{\frac{O_{model}}{\gamma_j B \log_2(1+SNR_j)}+T_{update}[j]\right\}.$$

$O_{model}$ is a quantity of parameters of the global model, $\gamma_j$ is a ratio of channel bandwidth allocated to a $j^{th}$ second node, and j is less than or equal to a quantity of second nodes included in the set S. $0 \le \gamma_j \le 1$ and $\Sigma_{j=1}^{|S|}\gamma_j \le 1$, and B is total bandwidth.

$$\max_{j \in S}\left\{\frac{O_{model}}{\gamma_j B \log_2(1+SNR_j)}+T_{update}[j]\right\}$$

indicates that a sum of local training time and uploading time of a local model of a second node Z in the set S is used as the time required for a round. The second node Z is a second node with a largest sum of local training time and uploading time of a local model in the set S.

Minimizing time required by the first node to collect local processing results fed back by the second nodes and perform global processing may be summarized as resolving the following problem 1:

$$\min_{S,\gamma_j} \beta\left(\theta+\frac{1}{|S|}\right)\cdot \max_{j \in S}\left\{\frac{O_{model}}{\gamma_j B \log_2(1+SNR_j)}+T_{update}[j]\right\} \quad \text{Problem 1}$$

$$\text{s.t. } 0 \le \gamma_j \le 1$$

$$\sum_{j=1}^{|S|}\gamma_j \le 1$$

$$\max_{j \in S}\left\{\frac{O_{model}}{\gamma_j B \log_2(1+SNR_j)}+T_{update}[j]\right\} \le T_{lim}$$

$$\min_{S,\gamma_j} \beta\left(\theta+\frac{1}{|S|}\right)\cdot \max_{j \in S}\left\{\frac{O_{model}}{\gamma_j B \log_2(1+SNR_j)}+T_{update}[j]\right\}$$

refers to a minimum value of time required by the machine learning system to execute $$\beta\left(\theta+\frac{1}{|S|}\right)$$

rounds. $T_{lim}$ the preset maximum processing time.

s.t. is an operator of a constraint condition. s.t.

$$0 \le \gamma_j \le 1,$$

$$\sum_{j=1}^{|S|}\gamma_j \le 1,$$

$$\max_{j \in S}\left\{\frac{O_{model}}{\gamma_j B \log_2(1+SNR_j)}+T_{update}[j]\right\} \le T_{lim}$$

indicates that the problem 1 needs to satisfy $$0 \le \gamma_j \le 1,$$

$$\sum_{j=1}^{|S|}\gamma_j \le 1,$$

-continued and $$\max_{j \in S}\left\{\frac{O_{model}}{\gamma_j B \log_2(1+SNR_j)}+T_{update}[j]\right\} \le T_{lim}.$$

$0 \le \gamma_j \le 1$ is a constraint condition 1. The constraint condition 1 means that a bandwidth allocation ratio value of the $j^{th}$ second node is greater than or equal to 0 and less than or equal to 1.

$$\sum_{j=1}^{|S|}\gamma_j \le 1$$

is a constraint condition 2. The constraint condition 2 means that a sum of bandwidth allocation ratio values separately corresponding to the second nodes included in the set S is less than or equal to 1.

$$\max_{j \in S}\left\{\frac{O_{model}}{\gamma_j B \log_2(1+SNR_j)}+T_{update}[j]\right\} \le T_{lim}$$

is a constraint condition 3. The constraint condition 3 means that the sum of the local training time and the uploading time of the second node with the largest sum of local training time and uploading time in the set S is less than or equal to the preset maximum processing time.

The first node selects the second nodes and determines the bandwidth allocation ratio values of the selected second nodes in a process of step 601 to step 605. The first node schedules the second nodes corresponding to the sequence numbers included in the second sequence based on the bandwidth allocation ratio values of the selected second nodes. Then, the first node performs local processing based on the local processing results fed back by the scheduled second nodes corresponding to the sequence numbers included in the second sequence. This minimizes the time required by the machine learning system to execute each round. The second nodes corresponding to the sequence numbers included in the second sequence may be understood as the second nodes included in the set S of the problem 1. The bandwidth allocation ratio values of the second nodes corresponding to the sequence numbers included in the second sequence may be understood as the bandwidth allocation ratio values of the second nodes included in the set S of the problem 1. In other words, the second nodes corresponding to the sequence numbers included in the second sequence and the bandwidth allocation ratio values of the second nodes corresponding to the sequence numbers included in the second sequence are solutions of the problem 1. For specific experiment data, refer to detailed descriptions of FIG. 7B below.

606: The first node schedules the second nodes corresponding to the sequence numbers included in the second sequence.

Figure 6B:
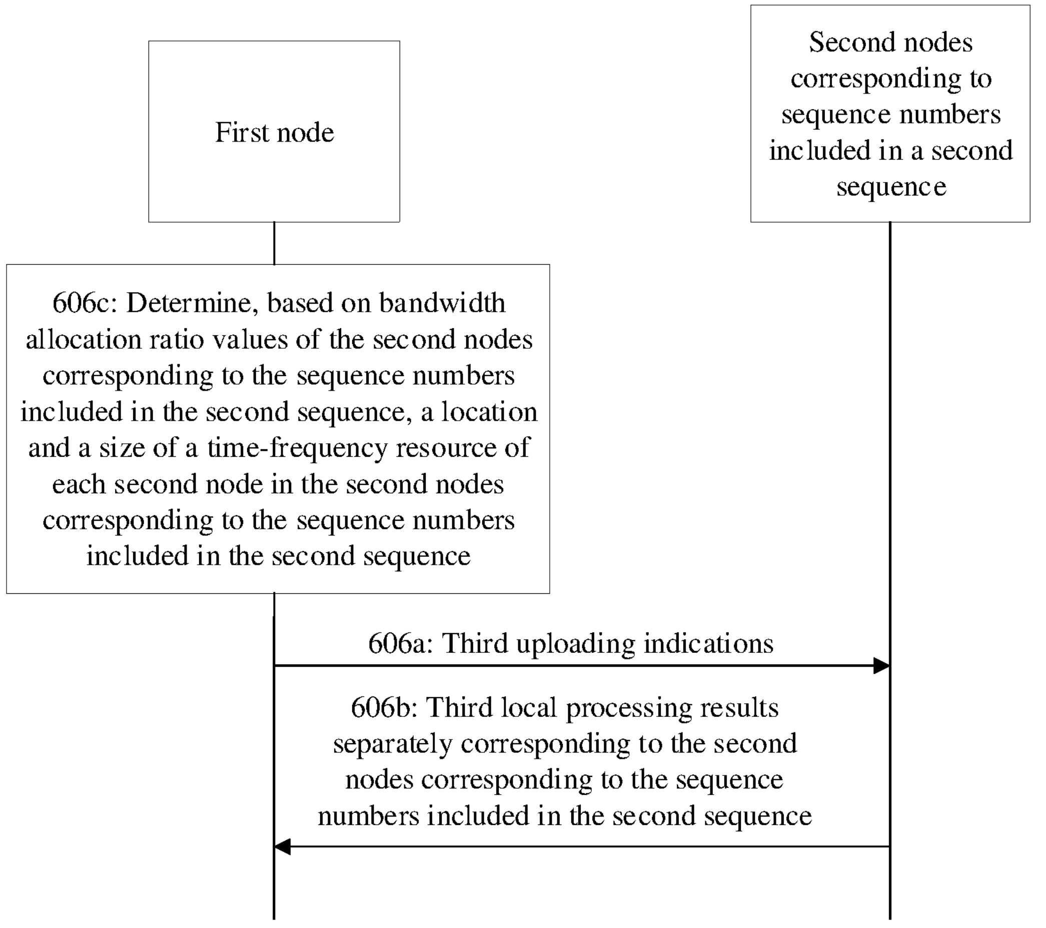
FIG. 6B is a schematic diagram of scheduling second nodes corresponding to sequence numbers included in a second sequence by a first node in a parallel scheduling system according to an embodiment of this application.

The following describes step 606 with reference to FIG. 6B. Step 606 specifically includes step 606*a* and step 606*b*.

Step 606*a*: The first node sends third uploading indications to the second nodes corresponding to the sequence numbers included in the second sequence. Correspondingly, the second nodes corresponding to the sequence numbers included in the second sequence receive the third uploading indications sent by the first node.

The third uploading indications indicate the second nodes corresponding to the sequence numbers included in the second sequence to separately report corresponding third local processing results. The third local processing results are determined by the second nodes corresponding to the sequence numbers included in the second sequence based on local processing parameters delivered by the first node. For related descriptions of the local processing parameter, refer to related descriptions of step 607 below.

Specifically, in the parallel scheduling system, the first node may simultaneously schedule the second nodes corresponding to the sequence numbers included in the second sequence. In other words, the first node sends, at locations of time-frequency resources separately corresponding to the second nodes corresponding to the sequence numbers included in the second sequence, the third uploading indications to the second nodes corresponding to the sequence numbers included in the second sequence. For related descriptions of determining, by the first node, the locations of the time-frequency resources of the second nodes corresponding to the sequence numbers included in the second sequence, refer to related descriptions of step 606*c* below.

Step 606*b*: The first node receives the third local processing results separately corresponding to the second nodes corresponding to the sequence numbers included in the second sequence. Correspondingly, the second nodes corresponding to the sequence numbers included in the second sequence separately send the corresponding third local processing results to the first node.

Specifically, the second nodes corresponding to the sequence numbers included in the second sequence separately send the corresponding third local processing results to the first node at the corresponding time-frequency resource locations. For related descriptions of the time-frequency resources separately corresponding to the second nodes corresponding to the sequence numbers included in the second sequence, refer to related descriptions of step 606*c* below.

Optionally, before step 606*a*, this embodiment further includes step 606*c*. Step 606*c* is performed before step 606*a*.

606*c*: The first node determines, based on the bandwidth allocation ratio values of the second nodes corresponding to the sequence numbers included in the second sequence, a location and a size of a time-frequency resource of each second node in the second nodes corresponding to the sequence numbers included in the second sequence.

Specifically, the first node determines the bandwidth allocation ratio values of the second nodes corresponding to the sequence numbers included in the second sequence, and then determines the location and the size of the time-frequency resource of each second node in the second nodes corresponding to the sequence numbers included in the second sequence with reference to the bandwidth allocation ratio values.

Based on step 606*c*, the third uploading indications in step 606*a* include location information and size information of the time-frequency resource of each second node in the second nodes corresponding to the sequence numbers included in the second sequence.

Specifically, the first node sends, by using the third uploading indications, location information and size information of the corresponding time-frequency resources to the second nodes corresponding to the sequence numbers included in the second sequence. In this way, the second nodes corresponding to the sequence numbers included in the second sequence can determine the locations and sizes of the time-frequency resources corresponding to the second nodes. The second nodes corresponding to the sequence numbers included in the second sequence may feed back the corresponding local processing results to the first node at the corresponding time-frequency resource locations.

Optionally, the embodiment shown in FIG. 6A further includes step 607. Step 607 is performed before step 606.

607: The first node sends the corresponding local processing parameters to the second nodes corresponding to the sequence numbers included in the second sequence. Correspondingly, the second nodes corresponding to the sequence numbers included in the second sequence separately receive the corresponding local processing parameters sent by the first node.

Step 607 is similar to step 405 in the embodiment shown in FIG. 4A. For details, refer to related descriptions of step 405 in the embodiment shown in FIG. 4A. Details are not described herein again.

There is no fixed execution sequence between step 607 and step 601 to step 605. Step 601 to step 605 may be performed before step 607, or step 607 may be performed before step 601 to step 605, or step 601 to step 605 and step 607 may be simultaneously performed based on a situation. This is not specifically limited in this application.

Optionally, this embodiment further includes step 608, and step 608 is performed after step 606.

608: The first node performs global processing based on the third local processing results of the second nodes corresponding to the sequence numbers included in the second sequence, to obtain a global processing result.

Step 610 is similar to step 305 in the embodiment shown in FIG. 3. For details, refer to related descriptions of step 305 in the embodiment shown in FIG. 3. Details are not described herein again.

Step 601 to step 608 may be understood as a round executed by the machine learning system. The machine learning system may execute a plurality of rounds, and operations of each round may be similar to those of step 601 to step 608.

FIG. 7A is another schematic interaction diagram of a node scheduling method according to an embodiment of this application. The embodiment shown in FIG. 7A is applied to a parallel scheduling system. In the parallel scheduling system, accuracy of a global processing result obtained by a first node after a plurality of rounds is required to be greater than or equal to preset accuracy. Time required by a machine learning system to execute a round is set to be greater than 0 and less than or equal to preset maximum processing time $T_{lim}$. In FIG. 7A, the node scheduling method includes the following steps.

701: The first node obtains local processing time separately corresponding to a plurality of second nodes and uploading time separately corresponding to the plurality of second nodes.

Step 701 is similar to step 301 in the embodiment shown in FIG. 3. For details, refer to related descriptions of step 301 in the embodiment shown in FIG. 3. Details are not described herein again.

702: The first node determines, based on the local processing time separately corresponding to the plurality of second nodes, the uploading time separately corresponding to the plurality of second nodes, and b pieces of first processing time, b bandwidth pre-allocation ratio values that are of each of the plurality of second nodes and that correspond to the b pieces of first processing time.

The b pieces of first processing time each are less than or equal to the preset maximum processing time $T_{lim}$, and $T_{lim}$ is greater than 0.

Specifically, the preset maximum processing time $T_{lim}$ is an upper limit of preset maximum time required by the machine learning system to execute a round. The b pieces of first processing time are b pieces of assumed possible time required by the machine learning system to execute a round. The b pieces of first processing time may be separately determined from $[0, T_{lim}]$ based on discrete unit time. For example, $T_{lim}$ is 4, and the discrete unit time is 1, so that the b pieces of first processing time are separately 1, 2, 3, and 4. In this embodiment, an example in which there are a plurality of pieces of first processing time is used to describe the technical solution in this embodiment of this application.

Optionally, an $r^{th}$ bandwidth pre-allocation ratio value $bound_{rp}$ that is of a $p^{th}$ second node and that corresponds to an $r^{th}$ piece of first processing time is equal to $C_p/(T_r-D_r)$, and "/" indicates division.

$C_p$ is uploading time of the $p^{th}$ second node when all bandwidth is allocated to the $p^{th}$ second node, $T_r$ is the $r^{th}$ piece of first processing time in the b pieces of first processing time, and $D_p$ is local processing time of the $p^{th}$ second node. r is an integer greater than or equal to 1 and less than or equal to b. p is an integer greater than or equal to 1 and less than or equal to N. N is a quantity of second nodes included in the parallel scheduling system.

For the $p^{th}$ second node, b bandwidth pre-allocation ratio values of the b pieces of first processing time are separately represented as $bound_{1p}$, $bound_{2p}$, $bound_{3p}$, $bound_{4p}$, . . . , and $bound_{bp}$. For example, $bound_{1p}$ refers to the $1^{st}$ bandwidth pre-allocation ratio value that is of the $p^{th}$ second node and that corresponds to the $1^{st}$ piece of first processing time. $bound_{2p}$ refers to the $2^{nd}$ bandwidth pre-allocation ratio value that is of the $p^{th}$ second node and that corresponds to the $2^{nd}$ piece of first processing time.

703: The first node determines, based on the b bandwidth pre-allocation ratio values, b first sequences corresponding to the b pieces of first processing time.

Sequence numbers included in an $r^{th}$ first sequence in the b first sequences are obtained by sequentially sorting sequence numbers of the plurality of second nodes based on $r^{th}$ bandwidth pre-allocation ratio values separately corresponding to the plurality of second nodes.

Specifically, $1^{st}$ bandwidth pre-allocation ratio values that are of the N second nodes and that correspond to the $1^{st}$ piece of first processing time in the b pieces of first processing time are separately $bound_{11}$, $bound_{12}$, $bound_{13}$, . . . , and $bound_{1N}$. For example, $bound_{11}$ refers to the $1^{st}$ bandwidth pre-allocation ratio value that is of the $1^{st}$ second node and that corresponds to the $1^{st}$ piece of first processing time. $bound_{12}$ refers to the $2^{nd}$ bandwidth pre-allocation ratio value that is of the $2^{nd}$ second node and that corresponds to the $1^{st}$ piece of first processing time. The first node sequentially sorts sequence numbers of the N second nodes in ascending order of $bound_{11}$, $bound_{12}$, $bound_{13}$, . . . , and $bound_{1N}$, to obtain the $1^{st}$ first sequence in the b first sequences. $2^{nd}$ bandwidth pre-allocation ratio values that are of the N second nodes and that correspond to the $2^{nd}$ piece of first processing time in the b pieces of first processing time are separately $bound_{21}$, $bound_{22}$, $bound_{23}$, . . . , and $bound_{2N}$. For example, $bound_{21}$ refers to the $2^{nd}$ bandwidth pre-allocation ratio value that is of the $1^{st}$ second node and that corresponds to the $2^{nd}$ piece of first processing time. $bound_{22}$ refers to the $2^{nd}$ bandwidth pre-allocation ratio value that is of the $2^{nd}$ second node and that corresponds to the $2^{nd}$ piece of first processing time. The first node sequentially sorts sequence numbers of the N second nodes in ascending order of $bound_{21}$, $bound_{22}$, $bound_{23}$, . . . , and $bound_{2N}$, to obtain the $2^{nd}$ first sequence in the b first sequences. By analogy, the b first sequences are obtained.

704: The first node uses b bandwidth pre-allocation ratio values that are of each second node and that correspond to the b pieces of first processing time as b bandwidth allocation ratio values that are of each second node and that correspond to the b pieces of first processing time.

In a possible implementation, b bandwidth allocation ratio values that are of the $p^{th}$ second node and that correspond to the b pieces of first processing time are $bound_{1p}$, $bound_{2p}$, $bound_{3p}$, $bound_{4p}$, . . . , and $bound_{bp}$.

705: The first node determines b fourth sequences based on the b first sequences and the b bandwidth allocation ratio values that are of each second node and that correspond to the b pieces of first processing time.

An $r^{th}$ fourth sequence in the b fourth sequences includes sequence numbers of x second nodes in the $r^{th}$ first sequence in the b first sequences. x is a maximum value that meets a fourth condition. The fourth condition includes that a sum of $r^{th}$ bandwidth allocation ratio values that are separately of the x second nodes and that correspond to the $r^{th}$ piece of first processing time is less than or equal to 1.

Specifically, step 604 in the embodiment shown in FIG. 6A shows a process of determining a corresponding second sequence for one piece of first processing time. In step 705, the b corresponding fourth sequences are determined for the b pieces of first processing time. A process of determining the b fourth sequences is similar to the process of determining the second sequence in step 604 in the embodiment shown in FIG. 6A. Details are not described herein again.

706: The first node selects a $k^{th}$ fourth sequence from the b fourth sequences, and uses the $k^{th}$ fourth sequence as a second sequence.

The $k^{th}$ fourth sequence is a fourth sequence that meets a fifth condition. The fifth condition includes that a sum of local processing time of a third node and uploading time of the third node is less than a sum of local processing time and uploading time of any fourth node.

The third node is a second node with a largest sum of local processing time and uploading time in second nodes corresponding to sequence numbers included in the $k^{th}$ fourth sequence.

The fourth node is a second node with a largest sum of local processing time and uploading time in second nodes corresponding to sequence numbers included in any fourth sequence, in the b fourth sequences, other than the $k^{th}$ fourth sequence.

For example, the b fourth sequences include four fourth sequences. The first node determines a sum of local processing time and uploading time of a second node with a largest sum of local processing time and uploading time in second nodes corresponding to sequence numbers included in each of the four fourth sequences. Details are as follows: In second nodes corresponding to sequence numbers included in the $1^{st}$ fourth sequence, a sum of local processing time and uploading time of a second node 1 is the largest, and is specifically 6. In second nodes corresponding to sequence numbers included in the $2^{nd}$ fourth sequence, a sum of local processing time and uploading time of a second node 2 is the largest, and is specifically 7. In second nodes corresponding to sequence numbers included in the $3^{rd}$ fourth sequence, a sum of local processing time and uploading time of a second node 3 is the largest, and is specifically 8. In second nodes corresponding to sequence numbers included in the $4^{th}$ fourth sequence, a sum of local processing time and uploading time of a second node 4 is the largest, and is specifically 9.

Therefore, it can be learned that the sum of the local processing time and the uploading time of the second node 1 in the $1^{st}$ fourth sequence is less than a sum of local processing time and uploading time corresponding to any one of the second node 2 in the $2^{nd}$ fourth sequence, the second node 3 in the $3^{rd}$ fourth sequence, and the second node 4 in the $4^{th}$ fourth sequence. Therefore, the first node selects the $1^{st}$ fourth sequence as the second sequence.

It should be noted that, when two or more fourth sequences in the b fourth sequences meet the fifth condition, the first node may select any one of the two or more fourth sequences as the second sequence.

For example, the b fourth sequences include four fourth sequences. The first node determines a sum of local processing time and uploading time of a second node with a largest sum of local processing time and uploading time in second nodes corresponding to sequence numbers included in each of the four fourth sequences. Details are as follows: In second nodes corresponding to sequence numbers included in the $1^{st}$ fourth sequence, a sum of local processing time and uploading time of a second node 1 is the largest, and is specifically 6. In second nodes corresponding to sequence numbers included in the $2^{nd}$ fourth sequence, a sum of local processing time and uploading time of a second node 2 is the largest, and is specifically 6. In second nodes corresponding to sequence numbers included in the $3^{rd}$ fourth sequence, a sum of local processing time and uploading time of a second node 3 is the largest, and is specifically 8. In second nodes corresponding to sequence numbers included in the $4^{th}$ fourth sequence, a sum of local processing time and uploading time of a second node 4 is the largest, and is specifically 8. The sum of the local processing time and the uploading time of the second node 1 is equal to the sum of the local processing time and the uploading time of the second node 2. Therefore, the first node may select the $1^{st}$ fourth sequence or the $2^{nd}$ fourth sequence.

Bandwidth allocation ratio values of the second nodes corresponding to the sequence numbers included in the $k^{th}$ fourth sequence are $k^{th}$ bandwidth allocation ratios that are of the second nodes corresponding to the sequence numbers included in the $k^{th}$ fourth sequence and that correspond to a $k^{th}$ piece of first processing time in the b pieces of first processing time.

Specifically, it can be learned from step 705 that the bandwidth allocation ratio values of the second nodes corresponding to the sequence numbers included in the $k^{th}$ fourth sequence are separately the $k^{th}$ bandwidth allocation ratios corresponding to the $k^{th}$ piece of first processing time.

The first node selects the second nodes and determines the bandwidth allocation ratio values of the selected second nodes in step 701 to step 706. The first node schedules the second nodes corresponding to the sequence numbers included in the second sequence based on the bandwidth allocation ratio values of the selected second nodes. Then, the first node performs local processing based on local processing results fed back by the second nodes corresponding to the sequence numbers included in the second sequence. This minimizes the time required by the machine learning system to execute each round. The second nodes corresponding to the sequence numbers included in the second sequence may be understood as the second nodes included in the set S of the problem 1. The bandwidth allocation ratio values of the second nodes corresponding to the sequence numbers included in the second sequence may be understood as the bandwidth allocation ratio values of the second nodes included in the set S of the problem 1. In other words, the second nodes corresponding to the sequence numbers included in the second sequence and the bandwidth allocation ratio values of the second nodes corresponding to the sequence numbers included in the second sequence are solutions of the problem 1 in step 605 in the embodiment shown in FIG. 6A. For specific experiment data, refer to detailed descriptions of FIG. 7B below.

707: The first node schedules the second nodes corresponding to the sequence numbers included in the second sequence.

Step 707 is similar to step 606 in the embodiment shown in FIG. 6A. For details, refer to related descriptions of step 606 in the embodiment shown in FIG. 6A. Details are not described herein again.

Optionally, this embodiment further includes step 708. Step 708 is performed before step 707.

708: The first node sends corresponding local processing parameters to the second nodes corresponding to the sequence numbers included in the second sequence.

Correspondingly, the second nodes corresponding to the sequence numbers included in the second sequence separately receive the corresponding local processing parameters sent by the first node.

There is no fixed execution sequence between step 708 and step 701 to step 706. Step 701 to step 706 may be performed before step 708, or step 708 may be performed before step 701 to step 706, or step 701 to step 706 and step 708 may be simultaneously performed based on a situation. This is not specifically limited in this application.

Optionally, this embodiment further includes step 709. Step 709 is performed after step 707.

709: The first node performs global processing based on the local processing results of the second nodes corresponding to the sequence numbers included in the second sequence, to obtain a global processing result.

Step 708 and step 709 are similar to step 606 to step 608. For details, refer to related descriptions of step 606 to step 608. Details are not described herein again.

Figure 7B:
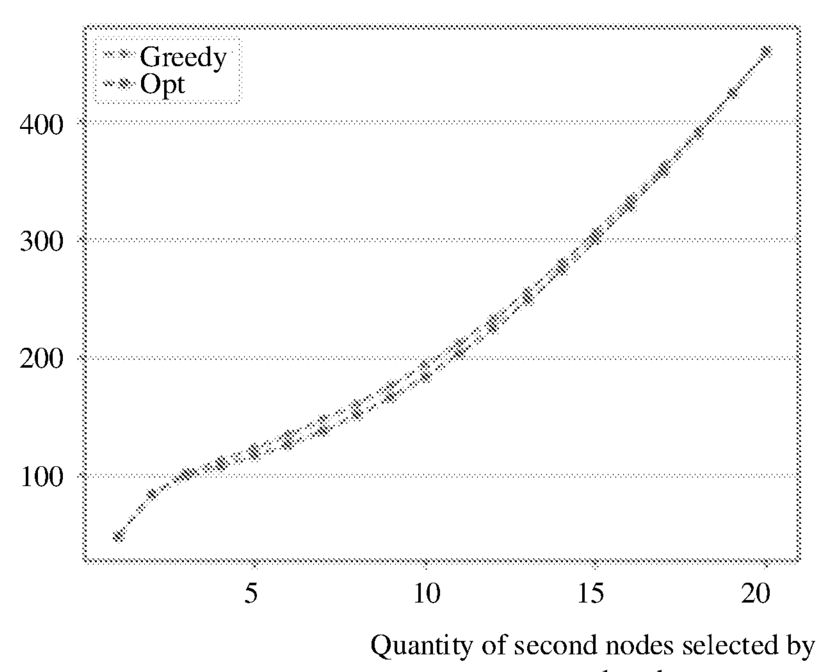
FIG. 7B is another schematic effect diagram of a node scheduling method according to an embodiment of this application.

In a frequency division multiple access (FDMA) communication system, a machine learning system executes a plurality of rounds according to the technical solution in the embodiment shown in FIG. 6A or FIG. 7A. FIG. 7B shows a sum of time required for rounds in which a same quantity of second nodes are selected in the plurality of rounds executed by the machine learning system according to the technical solution in the embodiment shown in FIG. 6A or FIG. 7A in the FDMA communication system. The FDMA communication system includes 200 second nodes. Local processing time of the 200 second nodes is 200 integers randomly generated in an interval of [1 s, 40 s]. Uploading time of the 200 second nodes is 200 integers randomly generated in an interval of [1 s, 100 s]. Each experiment is conducted for 120 rounds. In a process of each round, a first node randomly selects 20 second nodes as candidate second nodes. Then, the first node selects, according to the technical solution in the embodiment shown in FIG. 6A or FIG. 7A, a scheduled second node from the 20 second nodes, to obtain a local processing result fed back by the scheduled second node. The first node performs local processing based on the local processing result fed back by the scheduled second node, to obtain a global processing result. The first node repeats the experiment for 10 times. The first node averages experiment results of the 10 times of experiments, to obtain an average value of experiment results of each experiment, that is, an average value of time required for the 120 rounds.

In FIG. 7B, a horizontal coordinate is a quantity of second nodes selected by the first node, and a vertical coordinate is a sum of time separately required for rounds in which a quantity of selected second nodes is the quantity of second nodes represented by the horizontal coordinate. For example, as shown in FIG. 7B, in a dashed line shown by Opt, a value of a vertical coordinate corresponding to a horizontal coordinate 5 is a sum of time required for rounds, in the plurality of rounds, in which a quantity of selected second nodes is 5. A value of a vertical coordinate corresponding to a horizontal coordinate 10 is a sum of time required for rounds, in the plurality of rounds, in which a quantity of second nodes is 10. In FIG. 7B, the dashed line shown by OptCS is a schematic diagram of an effect obtained by the first node according to the technical solution in the embodiment shown in FIG. 6A or FIG. 7A. A dashed line shown by Greedy is a schematic diagram of an effect obtained by the first node by using a greedy algorithm.

It can be learned from FIG. 7B that, when accuracy of a global processing result obtained by the first node after the plurality of rounds is required to be greater than or equal to preset accuracy, compared with the technical solution in which the machine learning system uses the greedy algorithm, time required by the machine learning system to execute each round is short when the machine learning system uses the technical solution in the embodiment shown in FIG. 6A or FIG. 7A.

In the embodiment shown in FIG. 6A or FIG. 7A, in the parallel scheduling system, when the accuracy of the global processing result obtained by the first node after the plurality of rounds is required to be greater than or equal to the preset accuracy, and the time required by the machine learning system to execute a round is set to be greater than 0 and less than or equal to the preset maximum processing time $T_{lim}$, according to the technical solution shown in FIG. 6A or FIG. 7A, the time required by the machine learning system to execute each round is less than time required by the machine learning system to execute each round by using another algorithm. In other words, the time required by the machine learning system to execute each round is minimized.

Figure 8:
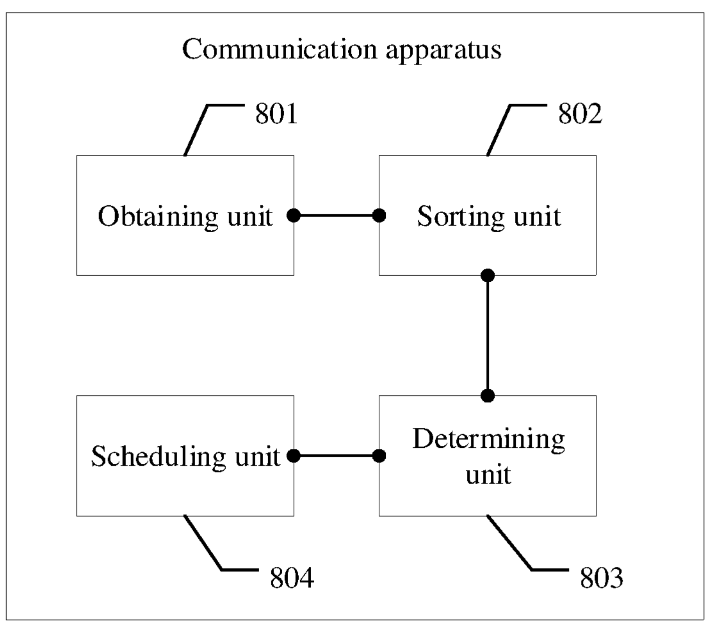
FIG. 8 is a schematic structural diagram of a communication apparatus according to an embodiment of this application.

The following describes communication apparatuses provided in embodiments of this application. FIG. 8 is a schematic structural diagram of a communication apparatus according to an embodiment of this application. The communication apparatus may be a first node, or a chip in the first node. The communication apparatus may be configured to perform the steps performed by the first node in the embodiments shown in FIG. 3, FIG. 4A, FIG. 4C, FIG. 5A, FIG. 6A, and FIG. 7A. For details, refer to related descriptions in the method embodiments.

Communication connections are established between the communication apparatus and a plurality of second nodes. The communication apparatus includes an obtaining unit 801, a sorting unit 802, a scheduling unit 804, and a determining unit 803.

The obtaining unit 801 is configured to obtain local processing time separately corresponding to the plurality of second nodes and/or uploading time of local processing results separately corresponding to the plurality of second nodes.

The sorting unit 802 is configured to sort sequence numbers of the plurality of second nodes based on the local processing time and/or the uploading time, to obtain a first sequence.

The determining unit 803 is configured to determine a second sequence based on the first sequence, where the second sequence includes some or all second node sequence numbers in the first sequence.

The scheduling unit 804 is configured to schedule second nodes corresponding to the sequence numbers included in the second sequence.

In a possible implementation, the local processing time includes time required by the plurality of second nodes to separately perform local training or local inference, and the uploading time includes time required by the plurality of second nodes to separately upload local training results or local inference results.

In another possible implementation, the sorting unit 802 is specifically configured to:

randomly select M second nodes from N second nodes, where M is an integer greater than 1 and less than or equal to N, and N is an integer greater than 1; and sort sequence numbers of the M second nodes based on local processing time and uploading time separately corresponding to the M second nodes, to obtain the first sequence.

In another possible implementation, the sorting unit 802 is specifically configured to:

sort the sequence numbers of the plurality of second nodes based on the local processing time and the uploading time, to obtain a third sequence;

randomly select M sequence numbers from N sequence numbers included in the third sequence, where M is an integer greater than 1 and less than or equal to N, and N is an integer greater than 1; and sequentially sort the M sequence numbers based on an order of the M sequence numbers in the third sequence, to obtain the first sequence.

In another possible implementation, the sequence numbers of the second nodes in the first sequence are sorted in ascending order of the local processing time, and sequence numbers of second nodes with same local processing time in the first sequence are sorted in ascending order of the uploading time.

In another possible implementation, the determining unit 803 is specifically configured to:

select sequence numbers off second nodes from the first sequence, to obtain the second sequence.

An order of the sequence numbers corresponding to the f second nodes in the first sequence is the same as an order of the sequence numbers corresponding to the f second nodes in the second sequence.

f is a maximum value that meets a first condition, and the first condition includes: a sum of first time and largest local processing time in local processing time of the f second nodes is less than or equal to preset maximum processing time.

The first time is equal to a sum of uploading time separately corresponding to the f second nodes minus overlapping time between the largest local processing time and the uploading time of the f second nodes, and f is an integer greater than 1.

In another possible implementation, the determining unit 803 is specifically configured to:

determine, according to a recursive algorithm, sequence numbers of e second nodes and an order of the e second nodes based on the first sequence, weights of the plurality of second nodes, the local processing time of the plurality of second nodes, and the uploading time of the plurality of second nodes, where e is an integer greater than 1; and the e second nodes meet a second condition, and the second condition includes that an obtained sum of weights of the e second nodes is maximum when time required by the communication apparatus to collect local processing results fed back by the e second nodes is less than or equal to preset maximum processing time; and determine the second sequence based on the sequence numbers of the e second nodes and the order of the e second nodes.

In another possible implementation, the scheduling unit 804 is specifically configured to:

schedule, based on an order of the second node sequence numbers in the second sequence, the second nodes corresponding to the sequence numbers included in the second sequence.

In another possible implementation, the second sequence includes a sequence number $a_i$ of the second node, $i \in [1, X]$, X is a quantity of second node sequence numbers in the second sequence, i is an integer, and X is an integer greater than 1.

A sequence number of an $a_i^{th}$ second node is before a sequence number of an $a_{i+1}^{th}$ second node.

The scheduling unit 804 is specifically configured to:

send a first uploading indication to the $a_i^{th}$ second node, where the first uploading indication indicates the $a_i^{th}$ second node to upload a first local processing result;

receive the first local processing result from the $a_i^{th}$ second node;

send a second uploading indication to the $a_{i+1}^{th}$ second node, where the second uploading indication indicates the $a_{i+1}^{th}$ second node to upload a second local processing result; and receive the second local processing result from the $a_{i+1}^{th}$ second node.

In another possible implementation, the sorting unit 802 is specifically configured to:

determine, based on the local processing time, the uploading time, and first processing time, a bandwidth pre-allocation ratio value that is of each of the plurality of second nodes and that corresponds to the first processing time, where the first processing time is less than or equal to preset maximum processing time; and determine, based on the bandwidth pre-allocation ratio value, the first sequence corresponding to the first processing time.

Sequence numbers included in the first sequence are obtained by sequentially sorting the sequence numbers of the plurality of second nodes based on bandwidth pre-allocation values corresponding to the plurality of second nodes.

In another possible implementation, a bandwidth pre-allocation ratio value corresponding to a $p^{th}$ second node in the plurality of second nodes is equal to $C_p/(T-D_p)$, $C_p$ is uploading time of the $p^{th}$ second node, T is the first processing time, $D_p$ is local processing time of the $p^{th}$ second node, p is an integer greater than or equal to 1, and "/" indicates division.

In another possible implementation, there is one piece of first processing time, and the determining unit 803 is specifically configured to:

use a bandwidth pre-allocation ratio value that is of each second node and that corresponds to the first processing time as a bandwidth allocation ratio value that is of each second node and that corresponds to the first processing time; and determine the second sequence in the first sequence based on the bandwidth allocation ratio value that is of each second node and that corresponds to the first processing time.

The second sequence includes sequence numbers of q second nodes in the first sequence.

An order of the sequence numbers corresponding to the q second nodes in the first sequence is the same as an order of the sequence numbers corresponding to the q second nodes in the second sequence.

q is a maximum value that meets a third condition, and the third condition includes: a sum of bandwidth allocation ratio values that are separately of the q second nodes and that correspond to the first processing time is less than or equal to 1, and a sum of local processing time and uploading time of a second node with a largest sum of local processing time and uploading time in the q second nodes is less than or equal to the first processing time.

In another possible implementation, there are b pieces of first processing time, b is an integer greater than 1, and the b pieces of first processing time separately correspond to b first sequences.

Sequence numbers included in an $r^{th}$ first sequence in the b first sequences are obtained by sequentially sorting the sequence numbers of the plurality of second nodes based on $r^{th}$ bandwidth pre-allocation ratio values separately corresponding to the plurality of second nodes.

An $r^{th}$ bandwidth pre-allocation ratio value of each of the plurality of second nodes is determined based on an $r^{th}$ piece of first processing time in the b pieces of first processing time, local processing time of each second node, and uploading time of each second node.

The determining unit 803 is specifically configured to:

use b bandwidth pre-allocation ratio values that are of each second node and that correspond to the b pieces of first processing time as b bandwidth allocation ratio values that are of each second node and that correspond to the b pieces of first processing time;

determine b fourth sequences based on the b first sequences and the b bandwidth allocation ratio values that are of each second node and that correspond to the b pieces of first processing time, where an $r^{th}$ fourth sequence in the b fourth sequences includes sequence numbers of x second nodes in the $r^{th}$ first sequence in the b first sequences;

an order of the sequence numbers corresponding to the x second nodes in the $r^{th}$ first sequence is the same as an order of the sequence numbers corresponding to the x second nodes in the $r^{th}$ fourth sequence; and x is a maximum value that meets a fourth condition, and the fourth condition includes: a sum of $r^{th}$ bandwidth allocation ratio values that are separately of the x second nodes and that correspond to the $r^{th}$ piece of first processing time is less than or equal to 1, and a sum of local processing time and uploading time of a second node with a largest sum of local processing time and uploading time in the x second nodes is less than or equal to the $r^{th}$ piece of first processing time; and select a $k^{th}$ fourth sequence from the b fourth sequences, and use the $k^{th}$ fourth sequence as the second sequence, where k is an integer greater than or equal to 1 and less than or equal to b.

The $k^{th}$ fourth sequence is a fourth sequence that meets a fifth condition.

The fifth condition includes that a sum of local processing time of a third node and uploading time of the third node is less than a sum of local processing time of any fourth node and uploading time of the fourth node.

The third node is a second node with a largest sum of local processing time and uploading time in second nodes corresponding to sequence numbers included in the $k^{th}$ fourth sequence.

The fourth node is a second node with a largest sum of local processing time and uploading time in second nodes corresponding to sequence numbers included in any one of b−1 fourth sequences, and the b−1 fourth sequences include a fourth sequence, in the b fourth sequences, other than the $k^{th}$ fourth sequence.

Bandwidth allocation ratio values of the second nodes corresponding to the sequence numbers included in the $k^{th}$ fourth sequence are $k^{th}$ bandwidth allocation ratios that are separately of the second nodes corresponding to the sequence numbers included in the $k^{th}$ fourth sequence and that correspond to a $k^{th}$ piece of first processing time in the b pieces of first processing time.

In another possible implementation, the scheduling unit 804 is specifically configured to: deliver third uploading indications to the second nodes corresponding to the sequence numbers included in the second sequence, where the third uploading indications indicate the second nodes corresponding to the sequence numbers included in the second sequence to separately report corresponding local processing results; and receive the local processing results separately sent by the second nodes corresponding to the sequence numbers included in the second sequence.

In another possible implementation, the determining unit 803 is further configured to: determine, based on bandwidth allocation ratios of the second nodes corresponding to the sequence numbers included in the second sequence, a location and a size of a time-frequency resource of each second node in the second nodes corresponding to the sequence numbers included in the second sequence.

The scheduling unit 804 is further configured to: deliver the third uploading indications to the second nodes corresponding to the sequence numbers included in the second sequence, where the third uploading indications include location information of the time-frequency resource and size information of the time-frequency resource.

In another possible implementation, the scheduling unit 804 is further configured to: receive computing capability information from the plurality of second nodes; the determining unit 803 is further configured to determine channel condition information separately corresponding to the communication apparatus and the plurality of second nodes; and the obtaining unit 801 is specifically configured to: determine the local processing time of the plurality of second nodes and the uploading time of the plurality of second nodes based on the computing capability information and the channel condition information.

In this embodiment of this application, the communication connections are established between the communication apparatus and the plurality of second nodes. The obtaining unit 801 is configured to obtain the local processing time separately corresponding to the plurality of nodes and/or the uploading time of the local processing results separately corresponding to the plurality of nodes. The sorting unit 802 is configured to sort the sequence numbers of the plurality of nodes based on the local processing time and/or the uploading time, to obtain the first sequence. The determining unit 803 is configured to determine the second sequence based on the first sequence, where the second sequence includes some or all node sequence numbers in the first sequence. The scheduling unit 804 is configured to schedule nodes corresponding to the sequence numbers included in the second sequence. In this way, a scheduling manner of selecting and scheduling the second nodes by the communication apparatus is optimized. Further, the communication apparatus may perform global processing with reference to the local processing results fed back by the second nodes. In this way, efficiency of performing global processing can be improved, or accuracy of a global processing result obtained by the first node can be improved.

Figure 9:
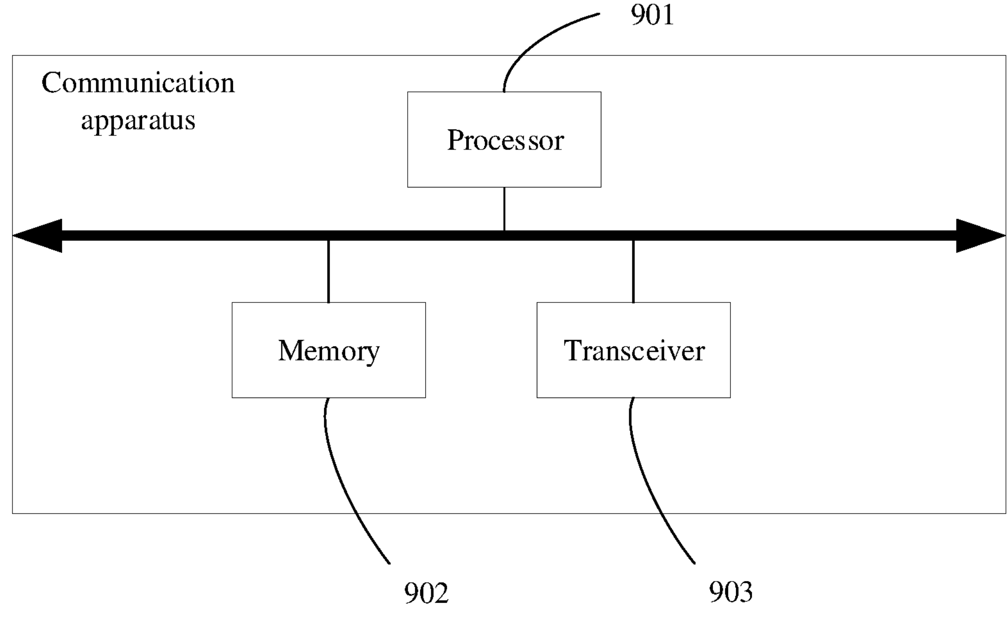
FIG. 9 is another schematic structural diagram of a communication apparatus according to an embodiment of this application.

This application further provides a communication apparatus. FIG. 9 is another schematic structural diagram of a communication apparatus according to an embodiment of this application. The communication apparatus may be configured to perform the steps performed by the first node in the embodiments shown in FIG. 3, FIG. 4A, FIG. 4C, FIG. 5A, FIG. 6A, and FIG. 7A. For details, refer to related descriptions in the method embodiments.

The communication apparatus includes a processor 901 and a memory 902. Optionally, the communication apparatus further includes a transceiver 903.

In a possible implementation, the processor 901, the memory 902, and the transceiver 903 are connected through a bus, and the memory stores computer instructions.

The obtaining unit 801, the sorting unit 802, and the determining unit 803 shown in FIG. 8 may be specifically the processor 901 in this embodiment. Therefore, a specific implementation of the processor 901 is not described again. The scheduling unit 804 in the foregoing embodiment may be specifically the transceiver 903 in this embodiment. Therefore, a specific implementation of the transceiver 903 is not described again.

In the communication apparatus shown in FIG. 9, the processor 901 and the memory 902 may be integrated or separately deployed. This is not specifically limited in this application.

It should be noted that the memory 902 shown in FIG. 9 may alternatively be deployed outside the communication apparatus shown in FIG. 9.

Figure 10:
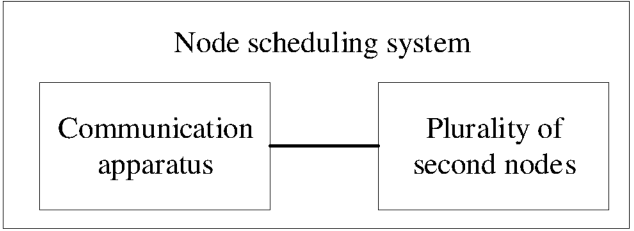
FIG. 10 is a schematic structural diagram of a node scheduling system according to an embodiment of this application.

With reference to FIG. 10, an embodiment of this application further provides a node scheduling system. The node scheduling system includes the communication apparatus shown in FIG. 8 and a plurality of nodes. The communication apparatus shown in FIG. 8 is configured to perform all or some of the steps performed by the first node in the embodiments shown in FIG. 3, FIG. 4A, FIG. 4C, FIG. 5A, FIG. 6A, and FIG. 7A. The plurality of second nodes are configured to perform all or some of the steps performed by the second nodes in the embodiments shown in FIG. 3, FIG. 4A, FIG. 4C, FIG. 5A, FIG. 6A, and FIG. 7A.

An embodiment of this application further provides a computer program product including computer instructions. When the computer program product runs on a computer, the computer is enabled to perform the node scheduling methods in the embodiments shown in FIG. 3, FIG. 4A, FIG. 4C, FIG. 5A, FIG. 6A, and FIG. 7A.

An embodiment of this application further provides a computer-readable storage medium, including computer instructions. When the computer instructions are run on a computer, the computer is enabled to perform the node scheduling methods in the embodiments shown in FIG. 3, FIG. 4A, FIG. 4C, FIG. 5A, FIG. 6A, and FIG. 7A.

An embodiment of this application further provides a chip apparatus, including a processor, configured to: be connected to a memory, and invoke a program stored in the memory, so that the processor performs the node scheduling methods in the embodiments shown in FIG. 3, FIG. 4A, FIG. 4C, FIG. 5A, FIG. 6A, and FIG. 7A.

The processor mentioned above may be a general-purpose central processing unit, a microprocessor, an application-specific integrated circuit (ASIC), or one or more integrated circuits for controlling program execution of the node scheduling methods in the embodiments shown in FIG. 3, FIG. 4A, FIG. 4C, FIG. 5A, FIG. 6A, and FIG. 7A. The memory mentioned above may be a read-only memory (ROM), another type of static storage device that can store static information and instructions, a random access memory (RAM), or the like.

It may be clearly understood by persons skilled in the art that, for the purpose of convenient and brief description, for a detailed working process of the described system, apparatus, and unit, refer to a corresponding process in the method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or a compact disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the scope of the technical solutions of embodiments of this application.

What is claimed is:

1. A method, applied to a first node, communication connections being established between the first node and a plurality of second nodes, and the method comprising:

obtaining, by the first node, a plurality of local processing times corresponding to the plurality of second nodes, and obtaining a plurality of uploading times of local processing results corresponding to the plurality of second nodes, wherein each local processing time corresponds to a second node of the plurality of second nodes, and each uploading time corresponds to a second node of the plurality of second nodes, and wherein each local processing time comprises a time required by a corresponding second node to perform local training or local inference, and each uploading time comprises a time required by a corresponding second node to upload a local training result or a local inference result;

sorting, by the first node, sequence numbers of the plurality of second nodes based on the plurality of local processing times and the plurality of uploading times, to obtain a first sequence;

determining, by the first node, a second sequence based on the first sequence, wherein the second sequence comprises some or all second node sequence numbers in the first sequence; and scheduling, by the first node, second nodes of the plurality of second nodes corresponding to the sequence numbers comprised in the second sequence; and wherein determining, by the first node, the second sequence based on the first sequence comprises:

selecting, by the first node, sequence numbers of f second nodes from the first sequence, to obtain the second sequence, wherein:

an order of the sequence numbers corresponding to the f second nodes in the first sequence is the same as an order of the sequence numbers corresponding to the f second nodes in the second sequence;

f is a maximum value that meets a first condition, and the first condition comprises: a sum of a first time and a largest local processing time in local processing times of the f second nodes is less than or equal to preset maximum processing time; and the first time is equal to a sum of uploading times corresponding to the f second nodes minus overlapping times between the largest local processing time and the uploading times corresponding to the f second nodes, and f is an integer greater than 1.

2. The method according to claim 1, wherein sorting, by the first node, the sequence numbers of the plurality of second nodes based on the plurality of local processing times and the plurality of uploading times, to obtain the first sequence comprises:

randomly selecting, by the first node, M second nodes from N second nodes, wherein M is an integer greater than 1 and less than or equal to N, and N is an integer greater than 1; and sorting, by the first node, sequence numbers of the M second nodes based on local processing times and uploading times corresponding to the M second nodes, to obtain the first sequence.

3. The method according to claim 1, wherein sorting, by the first node, sequence numbers of the plurality of second nodes based on the plurality of local processing times and the plurality of uploading times, to obtain the first sequence comprises:

sorting, by the first node, the sequence numbers of the plurality of second nodes based on the plurality of local processing times and the plurality of uploading times, to obtain a third sequence;

randomly selecting, by the first node, M sequence numbers from N sequence numbers comprised in the third sequence, wherein M is an integer greater than 1 and less than or equal to N, and N is an integer greater than 1; and sequentially sorting, by the first node, the M sequence numbers based on an order of the M sequence numbers in the third sequence, to obtain the first sequence.

4. The method according to claim 1, wherein the scheduling, by the first node, the second nodes corresponding to the sequence numbers comprised in the second sequence comprises:

scheduling, by the first node based on an order of the second node sequence numbers in the second sequence, the second nodes corresponding to the sequence numbers comprised in the second sequence.

5. The method according to claim 1, further comprising:

receiving, by the first node, computing capability information from the plurality of second nodes; and separately determining, by the first node, channel condition information corresponding to the first node and the plurality of second nodes; and wherein obtaining, by the first node, the plurality of local processing times corresponding to the plurality of second nodes and obtaining the plurality of uploading times of local processing results corresponding to the plurality of second nodes comprises:

determining, by the first node, the plurality of local processing times corresponding to the plurality of second nodes and the plurality of uploading times corresponding to the plurality of second nodes based on the computing capability information and the channel condition information.

6. The method according to claim 1, wherein the second sequence comprises only some of the second node sequence numbers in the first sequence.

7. An apparatus, comprising:

at least one processor; and a non-transitory computer readable storage medium storing a program that is executable by the at least one processor, the program including instructions to:

obtain a plurality of local processing times corresponding to a plurality of second nodes in communication connection with the apparatus, and obtain a plurality of uploading times of local processing results corresponding to the plurality of second nodes, wherein each local processing time corresponds to a second node of the plurality of second nodes, and each uploading time corresponds to a second node of the plurality of second nodes, and wherein each local processing time of the plurality of local processing times comprises a time required by a corresponding second node to separately perform local training or local inference, and each uploading time of the plurality of uploading times comprises a time required by a corresponding second node to separately upload a local training result or a local inference result;

sort sequence numbers of the plurality of second nodes based on the plurality of local processing times and the plurality of uploading times, to obtain a first sequence;

determine a second sequence based on the first sequence, wherein the second sequence comprises some or all second node sequence numbers in the first sequence, and wherein determining the second sequence based on the first sequence comprises:

determining, according to a recursive algorithm, sequence numbers of e second nodes and an order of the e second nodes based on the first sequence, weights of the plurality of second nodes, the plurality of local processing times of the plurality of second nodes, and the plurality of uploading times of the plurality of second nodes, wherein e is an integer greater than 1, wherein the e second nodes meet a second condition, and the second condition comprises that an obtained sum of weights of the e second nodes is maximum when time required by the apparatus to collect local processing results fed back by the e second nodes is less than or equal to preset maximum processing time; and determining the second sequence based on the sequence numbers of the e second nodes and the order of the e second nodes; and schedule second nodes of the plurality of second nodes corresponding to the sequence numbers comprised in the second sequence.

8. The apparatus according to claim 7, wherein the program includes instructions to:

randomly select M second nodes from N second nodes, wherein M is an integer greater than 1 and less than or equal to N, and N is an integer greater than 1; and sort sequence numbers of the M second nodes based on local processing times and uploading times corresponding to the M second nodes, to obtain the first sequence.

9. The apparatus according to claim 7, wherein the program includes instructions to:

sort the sequence numbers of the plurality of second nodes based on the plurality of local processing times and the plurality of uploading times, to obtain a third sequence;

randomly select M sequence numbers from N sequence numbers comprised in the third sequence, wherein M is an integer greater than 1 and less than or equal to N, and N is an integer greater than 1; and sequentially sort the M sequence numbers based on an order of the M sequence numbers in the third sequence, to obtain the first sequence.

10. The apparatus according to claim 7, wherein the sequence numbers of the plurality of second nodes in the first sequence are sorted in ascending order of corresponding local processing times, and sequence numbers of second nodes with same local processing time in the first sequence are sorted in ascending order of corresponding uploading times.

11. The apparatus according to claim 7, wherein the program includes instructions to:

schedule, based on an order of the second node sequence numbers in the second sequence, the second nodes corresponding to the sequence numbers comprised in the second sequence.

12. The apparatus according to claim 7, wherein the program further includes instructions to:

receive computing capability information from the plurality of second nodes;

determine channel condition information separately corresponding to the apparatus and the plurality of second nodes; and wherein the program includes instructions to:

determine the plurality of local processing times corresponding to the plurality of second nodes and the plurality of uploading times corresponding to the plurality of second nodes based on the computing capability information and the channel condition information.

13. The apparatus according to claim 7, wherein the second sequence comprises only some of the second node sequence numbers in the first sequence.

14. A system, comprising:

a first node device, comprising at least one processor and memory coupled to the at least one processor storing instructions that are executable by the at least one processor; and a plurality of second node devices;

wherein the first node device is configured to execute the instructions to:

obtain a plurality of local processing times corresponding to the plurality of second node devices in communication connection with the first node device, or obtain a plurality of uploading times of local processing results corresponding to the plurality of second node devices, wherein each local processing time corresponds to a second node device of the plurality of second node devices, or each uploading time corresponds to a second node device of the plurality of second node devices, and wherein each local processing time of the plurality of local processing times comprises a time required by a corresponding second node device to separately perform local training or local inference, and each uploading time of the plurality of uploading times comprises a time required by a corresponding second node device to separately upload a local training result or a local inference result;

sort sequence numbers of the plurality of second node devices based on the plurality of local processing times or the plurality of uploading times, to obtain a first sequence;

determine a second sequence based on the first sequence, wherein the second sequence comprises some or all second node sequence numbers in the first sequence; and schedule second node devices of the plurality of second node devices corresponding to the sequence numbers comprised in the second sequence; and wherein the first node device being configured to execute the instructions to determine the second sequence based on the first sequence comprises the first node device being configured to execute the instructions to:

select sequence numbers of f second nodes from the first sequence, to obtain the second sequence, wherein:

an order of the sequence numbers corresponding to the f second nodes in the first sequence is the same as an order of the sequence numbers corresponding to the f second nodes in the second sequence;

f is a maximum value that meets a first condition, and the first condition comprises: a sum of a first time and a largest local processing time in local processing times of the f second nodes is less than or equal to preset maximum processing time; and the first time is equal to a sum of uploading times corresponding to the f second nodes minus overlapping times between the largest local processing time and the uploading times corresponding to the f second nodes, and f is an integer greater than 1.

15. The system according to claim 14, wherein the second sequence comprises only some of the second node sequence numbers in the first sequence.

16. The system according to claim 14, wherein the first node device being configured to execute the instructions to sort the sequence numbers of the plurality of second node devices based on the plurality of local processing times and the plurality of uploading times, to obtain the first sequence, comprises the first node device being configured to execute the instructions to:

randomly select M second node devices from N second node devices, wherein M is an integer greater than 1 and less than or equal to N, and N is an integer greater than 1; and sort sequence numbers of the M second node devices based on local processing times and uploading times corresponding to the M second node devices, to obtain the first sequence.

17. The system according to claim 14, wherein the first node device being configured to execute the instructions to sort sequence numbers of the plurality of second node devices based on the plurality of local processing times and the plurality of uploading times, to obtain the first sequence, comprises the first node device being configured to execute the instructions to:

sort the sequence numbers of the plurality of second node devices based on the plurality of local processing times and the plurality of uploading times, to obtain a third sequence;

randomly select M sequence numbers from N sequence numbers comprised in the third sequence, wherein M is an integer greater than 1 and less than or equal to N, and N is an integer greater than 1; and sequentially sort the M sequence numbers based on an order of the M sequence numbers in the third sequence, to obtain the first sequence.

18. The system according to claim 14, wherein the first node device being configured to execute the instructions to schedule the second node devices corresponding to the sequence numbers comprised in the second sequence comprises the first node device being configured to execute the instructions to:

schedule, based on an order of the second node sequence numbers in the second sequence, the second node devices corresponding to the sequence numbers comprised in the second sequence.

19. The system according to claim 14, wherein the first node device is further configured to execute the instructions to:

receive computing capability information from the plurality of second node devices; and separately determine channel condition information corresponding to the first node device and the plurality of second node devices; and wherein the first node device being configured to execute the instructions to obtain the plurality of local processing times corresponding to the plurality of second node devices and obtain the plurality of uploading times of local processing results corresponding to the plurality of second node devices comprises the first node device being configured to execute the instructions to:

determine the plurality of local processing times corresponding to the plurality of second node devices and the plurality of uploading times corresponding to the plurality of second node devices based on the computing capability information and the channel condition information.

20. The system according to claim 14, wherein the plurality of second node devices are configured to:

report computing capability information to the first node device.

* * * * *